United States Patent
Kaushik

(10) Patent No.: US 10,162,598 B2
(45) Date of Patent: *Dec. 25, 2018

(54) FLASH OPTIMIZED COLUMNAR DATA LAYOUT AND DATA ACCESS ALGORITHMS FOR BIG DATA QUERY ENGINES

(71) Applicant: International Business Machines Corporation, Armonk, NY (US)

(72) Inventor: Rini Kaushik, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,748

(22) Filed: Apr. 3, 2018

(65) Prior Publication Data
US 2018/0225090 A1    Aug. 9, 2018

Related U.S. Application Data

(63) Continuation of application No. 15/693,513, filed on Sep. 1, 2017, which is a continuation of application
(Continued)

(51) Int. Cl.
*G06F 17/30* (2006.01)
*G06F 7/24* (2006.01)
*G06F 12/02* (2006.01)

(52) U.S. Cl.
CPC ............ *G06F 7/24* (2013.01); *G06F 12/0246* (2013.01); *G06F 17/30315* (2013.01); *G06F 17/30519* (2013.01); *G06F 2212/7208* (2013.01)

(58) Field of Classification Search
CPC . G06F 7/24; G06F 17/30442; G06F 17/30519
See application file for complete search history.

(56) References Cited

U.S. PATENT DOCUMENTS 5,848,406 A    12/1998    Mani et al.
5,918,225 A    6/1999    White et al.
(Continued)

FOREIGN PATENT DOCUMENTS

CN    101213510 A    7/2008
EP    2159681 A2    3/2010
(Continued)

OTHER PUBLICATIONS

Kaushik, R., "FlashRCFile: Flash-Optimized File Format for Interactive SQL on Hadoop", HotStorage '14, 6th USENIX Workshop on Hot Topics in Storage and File Systems, Jun. 17, 2014, Philadelphia, PA, 6 pages.
(Continued)

*Primary Examiner* — Etienne P Leroux
(74) *Attorney, Agent, or Firm* — Grant M. McNeilly

(57) ABSTRACT

A technique relates to flash-optimized data layout of a dataset for queries. Selection columns are stored in flash memory according to a selection optimized layout, where the selection optimized layout is configured to optimize predicate matching and data skipping. The selection optimized layout, for each selection column, is formed by storing a selection column dictionary filled with unique data values in a given selection column, where the unique data values are stored in sorted order in the selection column dictionary. Row position designations are stored corresponding to each row position that the unique data values are present within the given selection column, without duplicating storage of any of the unique data values that occur more than once in the given selection column.

2 Claims, 19 Drawing Sheets

Related U.S. Application Data

No. 14/305,179, filed on Jun. 16, 2014, now Pat. No. 9,846,567.

(56) References Cited

U.S. PATENT DOCUMENTS

| | | | |
|---|---|---|---|
| 6,330,555 | B1 | 12/2001 | Weber |
| 6,487,641 | B1 | 11/2002 | Cusson et al. |
| 7,024,414 | B2 | 4/2006 | Sah et al. |
| 7,756,873 | B2 | 7/2010 | Gould et al. |
| 8,121,975 | B2 | 2/2012 | Averbuch et al. |
| 8,150,850 | B2 | 4/2012 | Herrnstadt |
| 8,284,627 | B2 | 10/2012 | Belluomini et al. |
| 8,478,775 | B2 | 7/2013 | Netz et al. |
| 8,868,576 | B1 | 10/2014 | Faibish et al. |
| 9,298,854 | B2 | 3/2016 | Ikawa et al. |
| 9,633,058 | B2 | 4/2017 | Kaushik |
| 2003/0028509 | A1 | 2/2003 | Sah et al. |
| 2003/0093408 | A1 | 5/2003 | Brown et al. |
| 2004/0181533 | A1 | 9/2004 | Santosuosso |
| 2006/0277197 | A1 | 12/2006 | Bailey |
| 2007/0002612 | A1 | 1/2007 | Chang et al. |
| 2008/0086446 | A1 | 4/2008 | Zhang et al. |
| 2009/0043984 | A1 | 2/2009 | Chang et al. |
| 2009/0210445 | A1 | 8/2009 | Draese et al. |
| 2010/0278446 | A1 | 11/2010 | Ganesh et al. |
| 2011/0029376 | A1 | 2/2011 | Mills et al. |
| 2011/0295792 | A1 | 12/2011 | Mascarenhas et al. |
| 2012/0102350 | A1 | 4/2012 | Belluomini et al. |
| 2012/0198152 | A1 | 8/2012 | Terry et al. |
| 2013/0091098 | A1 | 4/2013 | Hung et al. |
| 2013/0103657 | A1 | 4/2013 | Ikawa et al. |
| 2013/0159285 | A1 | 6/2013 | Dees et al. |
| 2013/0275653 | A1 | 10/2013 | Ranade et al. |
| 2013/0312005 | A1 | 11/2013 | Chiu et al. |
| 2015/0039585 | A1* | 2/2015 | Fabijancic ........ G06F 17/30442 707/713 |
| 2015/0058352 | A1 | 2/2015 | Brand |
| 2015/0106578 | A1 | 4/2015 | Warfield et al. |
| 2015/0186434 | A1 | 7/2015 | Eichinger et al. |
| 2015/0363167 | A1 | 12/2015 | Kaushik |
| 2016/0283140 | A1 | 9/2016 | Kaushik |
| 2018/0011690 | A1* | 1/2018 | Kaushik ............ G06F 17/30519 |

FOREIGN PATENT DOCUMENTS

| | | | |
|---|---|---|---|
| EP | 2270643 | A1 | 1/2011 |
| JP | 2008545202 | A | 12/2008 |
| JP | 2012128718 | A | 7/2012 |
| JP | 4988215 | B2 | 8/2012 |
| JP | 5143730 | B2 | 2/2013 |
| JP | 201312212 | A | 6/2013 |
| JP | 5266250 | B2 | 8/2013 |
| KR | 1020080025178 | A | 3/2008 |
| KR | 1020120030079 | A | 3/2012 |
| WO | 2007002866 | A2 | 1/2007 |
| WO | 2015193771 | A1 | 12/2015 |

OTHER PUBLICATIONS

International Search Report and the Written Opinion of the International Searching Authority, International Application No. PCT/IB2015/054387, dated Sep. 29, 2015, 7 pages.

Anonymous, "Method and System for Reducing Storage Consumption using Virtual Storage Blocks and Block-Level Virtualization and Deduplication", Mar. 22, 2010, IP.com No. IPCOM000194381D, pp. 1-4, United States.

IBM, "A method for efficient recovery of file-level information from block level images, which is operating-system agnostic", Nov. 12, 2009, IP.com No. IPCOM000189510D, pp. 1-4, United States.

Lee, D. et al., "Benchmarking and Modeling Disk-based Storage Tiers for Practical Storage Design", ACM Performance Evaluation Review, Sep. 2012, pp. 113-118, vol. 40, No. 2, ACM, United States.

Kawabata et al., "InfoFrame DataBooster for High-Speed Processing of Big Data," NEG Technical Journal, 2012, pp. 28-32, v.7, n.2, United States.

Guoliang Zhou et al., "Cache Conscious Star-Join in MapReduce Environments," Proceedings of the 2nd International Workshop on Cloud Intelligence, Aug. 26, 2013, pp. 1-7, ACM, United States.

Pelley et al., "Do Query Optimizers Need to be SSDaware?", the Second International Workshop on Accelerating Data Management Systems using Modern Processor and Storage Architectures (ADMS'11), 8 pages, Copyright 2011.

Nath et al., "FlashDB: Dynamic Self-tuning Database for NAND Flash", IPSN'07, Apr. 25-27, 2007, Cambridge, Massachusetts, 10 pages, Copyright 2007 ACM.

Lee et al., "A Case for Flash Memory SSD in Enterprise Database Applications", SIGMOD'08, Jun. 9-12, 2008, Vancouver, BC, Canada, 12 pages, Copyright 2008 ACM.

Baumann et al., "Flashing Databases: Expectations and Limitations", Proceedings of the Sixth International Workshop on Data Management on New Hardware (DaMoN 2010), Jun. 7, 2010, Indianapolis, Indiana, 10 pages, Copyright 2010 ACM.

Tsirogiannis et al., "Query Processing Techniques for Solid State Drives", SIGMOD'09, Jun. 29-Jul. 2, 2009, Providence, Rhode Island, 13 pages, Copyright 2009 ACM.

Li et al., "Tree Indexing on Flash Disks", IEEE 25th International Conference on Data Engineering, Mar. 29-Apr. 2, 2009, Shanghai, 4 pages.

Yin et al., "A Sequential Indexing Scheme for Flash-Based Embedded Systems", EDBT'09, Mar. 24-26, 2009, Saint Petersburg, Russia, 12 pages, Copyright 2009 ACM.

Y. He et al., "RCFile: A Fast and Space-Efficient Data Placement Structure in MapReduce-Based Warehouse Systems," 2011 IEEE ICDE Conference 2011, pp. 1199-1208.

Microsoft, Microsoft Computer Dictionary, publish date 2002, pp. 64-65, 211-213, Copyright © 2002 by Microsoft Corporation.

Unknown, "IEEE 100: The Authoritative Dictionary of IEEE Standards Terms", Seventh Edition, publish date 2000, 1363 pages.

Application No. GB1621179.9, Patents Act 1977: Examination Report under Section 18(3), dated Mar. 30, 2017, 2 pages.

D. Abadi, et al., "Column-Stores vs. Row-Stores: How Different are They Really?" SIGMOD'08, Jun. 9-12, 2008, Vancouver, BC, Canada; pp. 1-14.

S. Agarwal, et al., "BlinkDB: Queries with Bounded Errors and Bounded Response Times on Very Large Data," Eurosys'13 Apr. 15-17, 2013, Prague, Czech Republic; pp. 29-42.

A. Ailamaki, et al., "Weaving Relations for Cache Performance," Proceeding of the 27th VLDB Conference, Roma, Italy, 2001; pp. 1-12.

GOOGLE Cloud Platform, "BigQuery," Internet retrieval https://cloud.google.com/products/bigquery; retrieval date Jun. 12, 2014; pp. 1-7.

IBM, "What's the big deal about Big SQL?," http://www.ibm.com/developersworks/library/bd-bigsql/ ; dated Jun. 14, 2013; pp. 1-9.

S. Lee, et al., "Design of Flash-Based DBMS: An In-Page Logging Approach," SIGMOD '07, Jun. 12-14, 2007, Beijing, China; pp. 55-66.

Y Li, et al., "Tree Indexing on Solid State Drives," Proceedings of the VLDB Endowment, vol. 3, No. 1, Copyright 2010; pp. 1-12.

S. Melnik, et al., "Dremel: Interactive Analysis of Web-Scale Datasets," Proceedings of the VLDB Endowment, vol. 3, No. 1; Copyright 2010; pp. 1-10.

K. Ross, et al., "Modeling the Performance of Algorithms on Flash Memory Devices," Proceedings of the Fourth International Workshop on Data Management on New Hardware (DaMoN 2008), Jun. 13, 2008, Vancouver, Canada; Copyright 2008; pp. 11-16.

J. Shute, et al., "F1: A Distributed SQL Database That Scales," Proceeding of the VLDB Endowment, vol. 6, No. 11, Copyright 2013; pp. 1-12.

M. McCarthy, et al., "Efficient Updates for OLAP Range Queries on Flash Memory," Advance Access Publication on Feb. 2, 2011; The Computer Journal, vol. 54; No. 11, 2011; pp. 1776-1789.

Rockwood et al., "Optimizing analytic workloads using DB2 10.5 with BLU Acceleration", IBM DB2 for Linux, UNIX, and Windows, Updated: May 2014, 27 pages.

(56) References Cited

OTHER PUBLICATIONS

Kaushik, R., "File System Block-Level Tiering and Co-Allocation", U.S. Appl. No. 15/904,190, filed Feb. 23, 2018.
IBM, List of IBM Patents or Patent Applications Treated as Related, Apr. 2, 2018, 2 pages.

* cited by examiner

TABLE 502

Row Group ($RG_1$)   Row Group($RG_2$)   Row Group($RG_N$)

$c_k$ $c_3$ $c_2$ $c_1$ $r_1$  $r_2$   $r_n$   $\bullet\bullet\bullet$   $r_N$

FIG. 5

FLASH OPTIMIZED COLUMNAR DATA LAYOUT AND DATA ACCESS ALGORITHMS FOR BIG DATA QUERY ENGINES

BACKGROUND

The present invention relates to flash-optimized data layout and data access algorithms used during query processing.

The term "Big Data" was coined and caught on quickly as a blanket term for any collection of datasets so large and complex that it becomes difficult to process using on-hand database management tools or traditional data processing applications. The challenges include capture, curation, storage, search, sharing, transfer, analysis and visualization. The trend to larger data sets is due to the additional information derivable from analysis of a single large set of related data, as compared to separate smaller sets with the same total amount of data, allowing correlations to be found to spot business trends, determine quality of research, prevent diseases, link legal citations, combat crime, and determine real-time roadway traffic conditions.

In 2012, limits on the size of data sets that are feasible to process in a reasonable amount of time were on the order of exabytes of data, that is, millions of terabytes. Scientists regularly encounter limitations due to large data sets in many areas, including meteorology, genomics, connectomics, complex physics simulations, and biological and environmental research. The limitations also affect Internet search, finance and business informatics. Data sets grow in size in part because they are increasingly being gathered by ubiquitous information-sensing mobile devices, aerial sensory technologies (remote sensing), software logs, cameras, microphones, radio-frequency identification (RFID) readers, and wireless sensor networks. The world's technological per-capita capacity to store information has roughly doubled every 40 months since the 1980s. As of 2012, every day 2.5 exabytes ($2.5 \times 10^{18}$) of data were created.

Big data is difficult to work with using most relational database management systems and desktop statistics and visualization packages, requiring instead massively parallel software running on tens, hundreds, or even thousands of servers. What is considered "Big data" varies depending on the capabilities of the organization managing the set, and on the capabilities of the applications that are traditionally used to process and analyze the data set in its domain. For some organizations, facing hundreds of gigabytes of data for the first time may trigger a need to reconsider data management options. For others, it may take tens or hundreds of terabytes before data size becomes a significant consideration. Big Data usually includes data sets with sizes beyond the ability of commonly used software tools to manage, and process the data within a tolerable elapsed time.

SUMMARY

According to one embodiment, a method for flash-optimized data layout of a dataset for queries is provided. The method includes storing, by a processor, selection columns in flash memory according to a selection optimized layout, where the selection optimized layout is configured to optimize predicate matching and data skipping. The selection optimized layout, for each selection column, is formed by storing a selection column dictionary filled with unique data values in a given selection column, where the unique data values are stored in sorted order in the selection column dictionary. The selection optimized layout is formed by storing row position designations corresponding to each row position that the unique data values are present within the given selection column, without duplicating storage of any of the unique data values that occur more than once in the given selection column.

According to one embodiment, an apparatus for flash-optimized storage of a dataset for queries is provided. The apparatus includes a processor, and memory comprising computer-executable instructions that, when executed by the processor, cause the processor to perform operations. The operations includes storing, by the processor, selection columns in flash memory according to a selection optimized layout, where the selection optimized layout is configured to optimize predicate matching and data skipping. The selection optimized layout, for each selection column, is formed by storing a selection column dictionary filled with unique data values in a given selection column, where the unique data values are stored in sorted order in the selection column dictionary. The selection optimized layout is formed by storing row position designations corresponding to each row position that the unique data values are present within the given selection column, without duplicating storage of any of the unique data values that occur more than once in the given selection column.

According to one embodiment, a computer program product for flash-optimized storage of a dataset for queries is provided. The computer program product includes a computer readable storage medium having program instructions embodied therewith, where the program instructions executable by a processing circuit cause the processing circuit to perform a method. The method includes storing, by a processor, selection columns in flash memory according to a selection optimized layout, where the selection optimized layout is configured to optimize predicate matching and data skipping. The selection optimized layout, for each selection column, is formed by storing a selection column dictionary filled with unique data values in a given selection column, where the unique data values are stored in sorted order in the selection column dictionary. The selection optimized layout is formed by storing row position designations corresponding to each row position that the unique data values are present within the given selection column, without duplicating storage of any of the unique data values that occur more than once in the given selection column.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a table illustrating rows and columns grouped into row groups according to an embodiment;

DETAILED DESCRIPTION

Figure 1A:
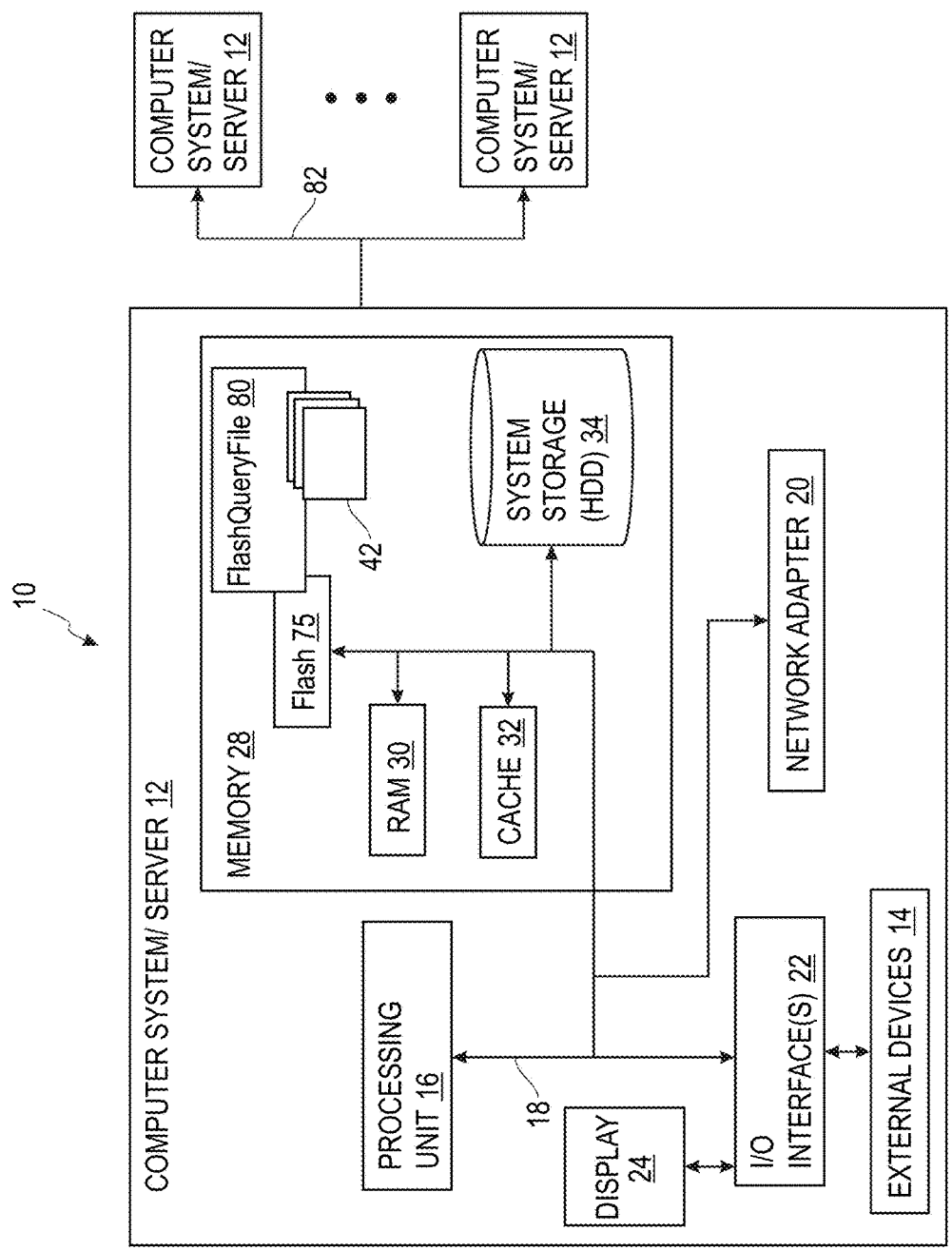
FIG. 1A illustrates a schematic of a computer system/server in a cloud computing node/cluster according to an embodiment.

Ad hoc interactive analytics over petabytes of data is gaining rapid traction and Big Data warehouses are becoming increasingly popular. Performance of ad hoc Big Data query processing depends heavily on the storage performance. Specialized columnar and row-columnar data layouts and associated algorithms have been developed to speed up query processing by limiting data reads only to the columns specified in the queries. Nevertheless, these layouts end up reading a significant amount of data irrelevant to the query. Minimizing the amount of data read per query and leveraging faster, randomly accessible storage mediums such as flash as an additional storage tier and extended cache is important for further improving query performance and throughput. Flash has very different performance characteristics from hard disk (also referred to as hard disk drive (HDD)); data layouts and access algorithms optimized for hard disks result in suboptimal performance on flash. HDD-optimized layouts and algorithms are designed to avoid random I/O as much as possible given the high seek times inherent in HDDs, and sequential accesses are emphasized as they are orders of magnitude faster than random accesses on HDDs. On the other hand, random accesses are fast on flash (40×-1000× faster than HDD) as there is no seek penalty in flash. The different performance characteristic of flash calls out for a fundamental redesign of the layouts and algorithms.

Embodiments present a new flash-optimized data layout in what is called FlashQueryFile, the associated serializer/deserializer for the FlashQueryFile, and selection algorithms and projection algorithms for speeding up ad hoc query processing of the (table in) FlashQueryFile. Note that the data layout is the table/column structure in which data is stored in flash. FlashQueryFile significantly reduces the data read per query by aggressively skipping over unnecessary data. Unlike the state-of-the-art layouts that have been designed for hard disks, FlashQueryFile is designed to exploit maximum performance from flash by fully exploiting high random access performance and high internal IO (input and output) parallelism possible in flash. FlashQueryFile results in 4×-100×TPC-H query speedup and 29%-99.08% data reduction with query selectivity ranging from <1%-98% compared to HDD-optimized row-columnar data layout and its associated algorithms on flash. Note that TPCH is an ad hoc decision support benchmark by the Transaction Processing Performance Council (TPC).

Big Data warehouses such as Hive, BigQuery, BigSQL, Impala, Presto, and HAWQ are increasingly become commonplace. The ability to interactively run ad hoc analytical (OLAP) SQL queries over petabytes of data is becoming extremely important for businesses. Traditional OLAP techniques for speeding up analytical queries such as precomputed cubes do not work in the case of Big Data, because the dimensions in Big Data sets are many-fold and maintaining a cube across all dimensions is prohibitively expensive. Given the ad hoc nature of the queries, techniques such as indexing or caching do not help either. Data may not be present in the cache when the query arrives, or the data may be too big to keep in the cache as analytical queries typically access historical as well as recent data. As a result, the ability to quickly access uncached data from storage plays an important role in interactive processing of ad hoc queries. Performance of storage is vital for reducing the overall ad hoc analytical query processing time and throughput.

The Big Data warehouses do not manage the storage themselves and rely on the underlying distributed file system to store the data for them. F1/BigQuery use Colossus file system and SQL over Hadoop systems such as Hive, Impala, etc., use Hadoop distributed file system (HDFS). Serializers/deserializers (also referred to as serdes), with layouts and algorithms especially designed for Big Data query processing, are used to read and write table data to the file system (e.g., record-columnar (RCFile), optimized record-columnar (ORCFile), and Parquet). Each serde (i.e., serializer and deserializer) defines its own file/data layout, metadata, in-memory data structures, table read, scan, and ingest operators. These serdes cut down the amount of data read per query as they limit data reads only to the columns that appear in the query instead of reading all the columns in the table. However, these serializers/deserializers sequentially scan the entire columnar table data for all the columns in the query and end up reading a lot of irrelevant data as not all data in the columns is relevant to the query. The ORCFile attempts to reduce the overhead of the table scan operator by maintaining summary information about the columns such as max and min values which the ORCFile leverages to skip some data at a very coarse-grained basis based on the predicate. This technique is effective in skipping data when the column data of the columns in the selection clause is sorted and has high cardinality (large number of distinct values). However, a majority of columns are not inherently sorted and have low cardinality. There is a need to develop io-efficient layouts and techniques that allow fine-grained, intra-row-group data skipping to further reduce the data that needs to be read per query.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Referring now to FIG. 1A, a schematic of an example of a cloud computing node/cluster is shown according to an embodiment. Cloud computing node/cluster 10 is only one example of a suitable cloud computing node/cluster that may be utilized in storing/processing Big Data and is not intended to suggest any limitation as to the scope of use or functionality of embodiments described herein. Regardless, cloud computing node/cluster 10 is capable of being implemented and/or performing any of the functionality set forth herein.

In cloud computing node/cluster 10 there are multiple computer systems/servers 12, which are operational with numerous other general purpose or special purpose computing system environments or configurations. The multiple computer systems/servers 12 are connected through connections 82 (such as fiber optics, etc.). Although specific details of one computer system/server 12 are shown in FIG. 1A, the details apply to the other computer systems/servers 12 in the computer node/cluster 10. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node/cluster 10 is shown in the form of a general-purpose computing device. The components of computer system/server 12 may include, but are not limited to, one or more processors or processing units 16, a system memory 28, and a bus 18 that couples various system components including system memory 28 to processor 16. The processor units 16 include processing circuitry (processor circuits) to read, process, and execute computer executable instructions as understood by one skilled in the art.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive", "hard disk", and/or "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The memory 28 by way of example, and not limitation, may include an operating system, one or more application programs, other program modules, and program data. The operating system, one or more application programs, other program modules, and program data (or some combination thereof) may include an implementation of a networking environment.

Additionally, the computer system/server 12 includes flash memory 75 (also referred to as flash). The flash memory 75 stores Big Data along with the hard disk drive 34 as discussed herein according to embodiments. The flash memory 75 includes the FlashQueryFile 80. The FlashQueryFile 80 may be stored in other portions of memory 28. The FlashQueryFile 80 has program modules 42 (which may be one or more software applications) that carry out the functions and/or methodologies of embodiments as described herein. The FlashQueryFile 80 may implement algorithms discussed further herein. Although features of the FlashQueryFile 80 are highlighted in a single computer system/server 12, the FlashQueryFile 80 (and its functionality) may be distributed across other computer systems/servers 12 in the computing node/cluster 10. The FlashQueryFile 80 is configured with all software elements needed to implement embodiments discussed herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
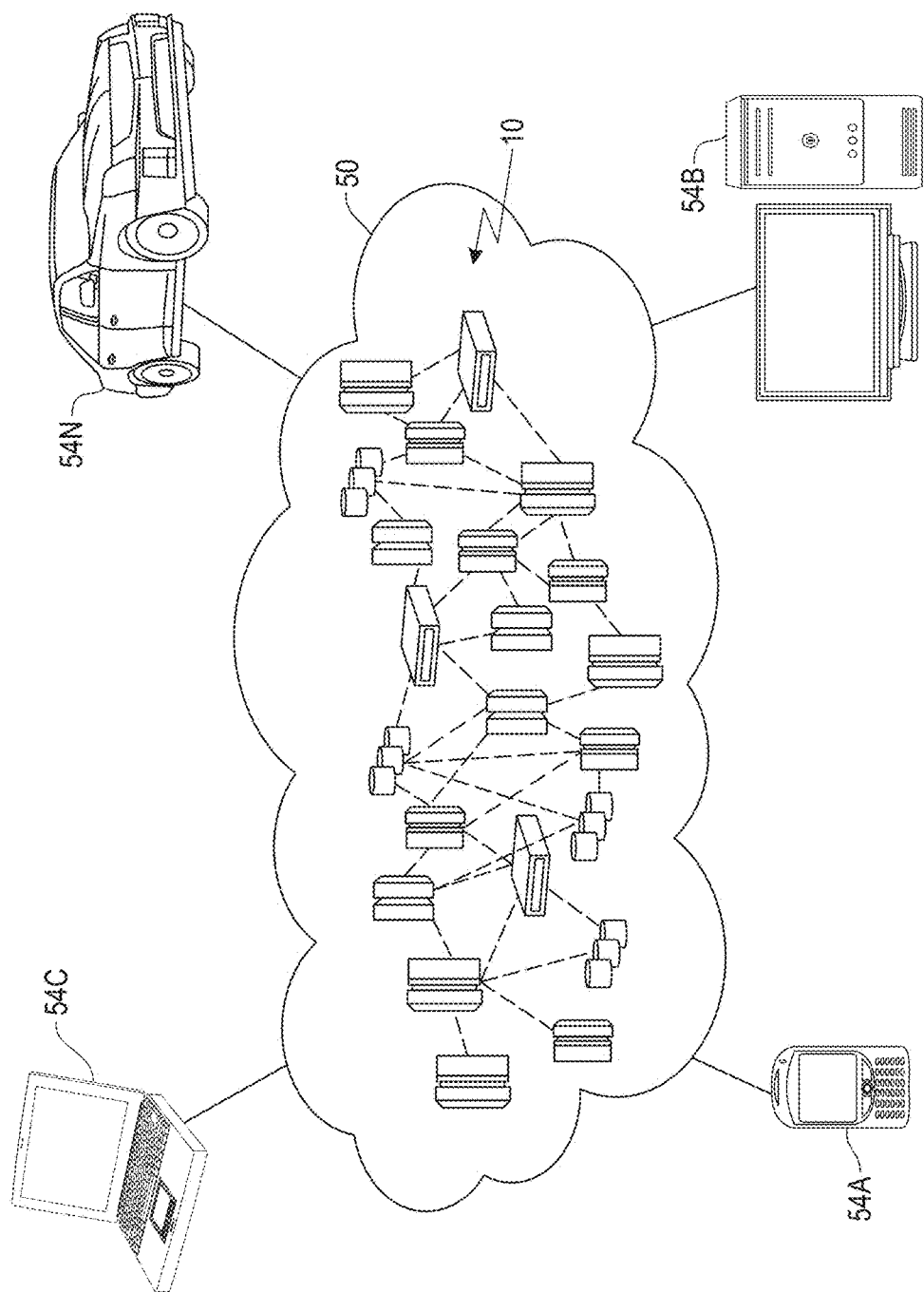
FIG. 1B illustrates a cloud computing environment 50 having one or more cloud computing nodes/cluster according to an embodiment.
Figure 1C:
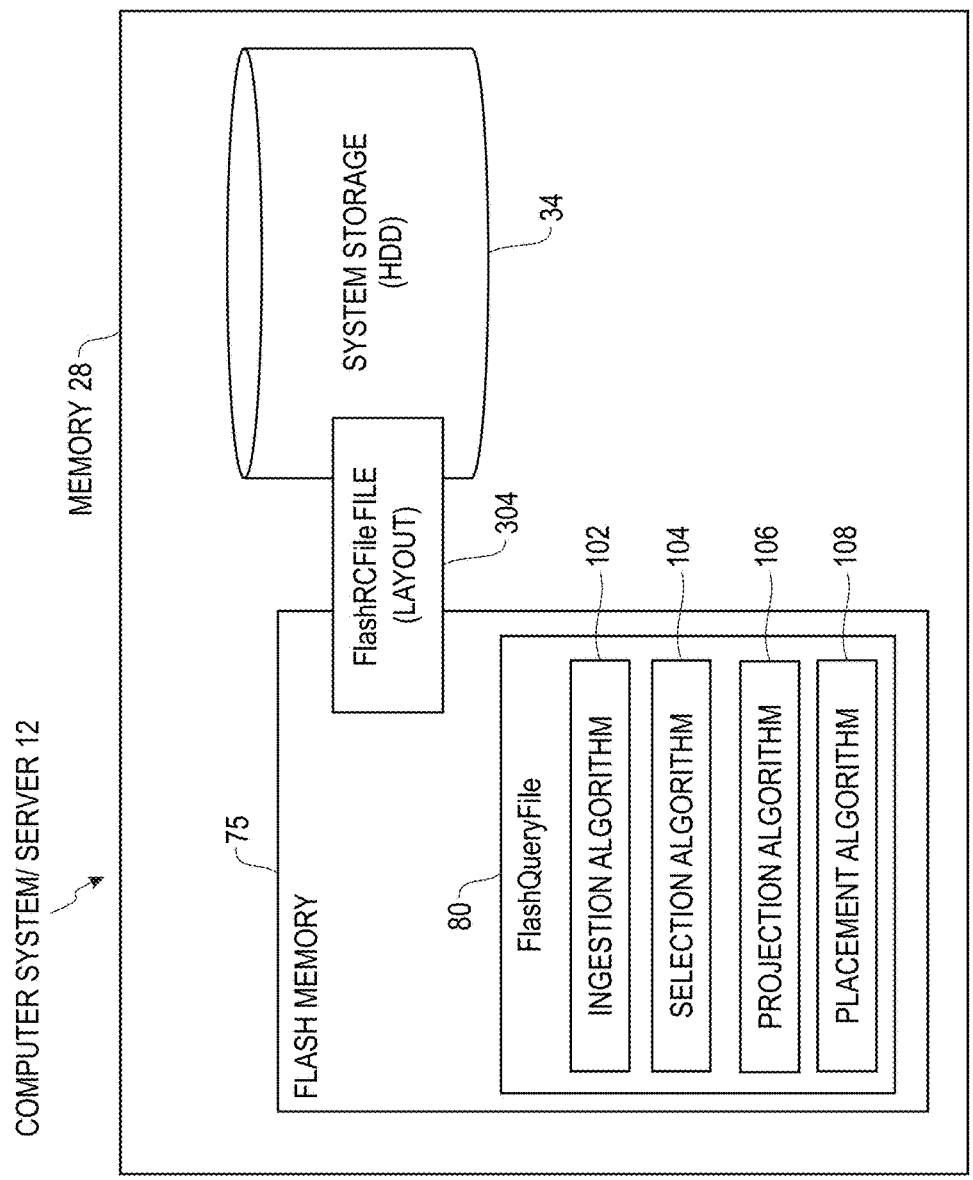
FIG. 1C illustrates further details of features in the computer system/server according to an embodiment.

Referring now to FIG. 1B, illustrative cloud computing environment 50, which may be considered as a Big Data warehouse, is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. The cloud computing environment 50 may include numerous nodes/clusters 10 that store, process, and query data from computing devices 54A-N according to embodiments. Nodes/clusters 10 may communicate with one another via connections 82 (such as fiber optic connections). They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser). FIG. 1C illustrates further details of features in the computer system/server according to an embodiment while omitting some features so as not to obscure the figure.

For Big Data, storage performance for query processing can be enhanced in three ways: 1) reducing the data that needs to be scanned per query by using IO-efficient serdes and columnar layouts, 2) relying on scale-out parallelism for higher IO throughput, and/or 3) leveraging faster mediums such as memory or flash for fast access to data. This disclosure focuses on enhancing storage performance using techniques 1) and 3) according to embodiments. The disclosure provides new mechanisms that allow fine-grained skipping of columnar data at intra-row-group level to reduce the data read per query to enhance the performance of the query processing.

State-of-the-art serdes are designed for hard disks (HDD), in which all architectural decisions, data structures, projection algorithms, selection algorithms, and join algorithms, along with parameters, are based on the fundamental performance characteristics of HDDs. Random I/O is avoided as much as possible given the high seek times inherent in HDDs, and sequential accesses are emphasized as they are orders of magnitude faster than random accesses on HDDs. A popular way to leverage faster and randomly accessible storage mediums such as flash in the storage hierarchy has been via reactive tiering. In reactive tiering, the storage module monitors the access patterns to the data and moves data that is getting accessed frequently to the high performance flash tier (i.e., flash memory). Such a movement is done transparently without any application awareness. As a result, the application continues to access the data which is now residing on flash with the same algorithms, prefetching mechanisms, APIs (application program interfaces) that were inherently designed for hard disks. As a result, the performance achieved is only a fraction of the performance achievable with flash optimized algorithms and code disclosed in embodiments. As used in the state-of-the-art, simple data placement of one of the existing SQL (Structured English Query Language) file formats in flash while using HDD-optimized algorithms and assumptions is able to leverage very little performance gain and fine-grained data skipping which are otherwise achievable with such randomly accessible mediums. In order to extract optimal performance/$ to justify the higher cost of flash, the transition from sequentially accessed HDDs to randomly accessible storage mediums such as flash mandates a reexamination of fundamental design decisions, data layouts, selection, and projection operators of the serdes.

However, embodiments provide a novel flash optimized serializer/deserializer called FlashQueryFile 80 for SQL over Big Data stored in the computer nodes/cluster 10. FlashQueryFile's selection algorithm, projection algorithm, ingestion algorithm, data layouts, and metadata are optimized for randomly accessible storage such as flash (flash memory 75) to yield optimal performance/$. FlashQueryFile 80 is storage tiering aware and provides mechanism for predictive placement of a subset of flash-appropriate, popular columns in the flash tier (flash memory 75) in an application-aware manner. This allows FlashQueryFile 80 to provide upfront performance guarantees to ad hoc analytical queries. FlashQueryFile 80 reduces query processing latency by only reading data absolutely necessary for the query during selections and projections by fundamentally redesigning data structures and metadata to allow fine-grained data skipping and by leveraging predicate pushdown and late materialization. FlashQueryFile 80 also exploits data access parallelism in its selection algorithm which is made possible by internal IO parallelism allowed by flash. FlashQueryFile 80 carefully considers characteristics of flash 75 in balancing sequential and random accesses in the scan algorithm which is very important as each random access also has an API overhead associated with it. Naively making a number of small random accesses instead of one large sequential access can actually hurt performance if the API call overhead becomes dominant. Finally, FlashQueryFile 80 showcases the importance of using high-performance IO APIs, object serialization and deserialization, and data structures to be able to derive the performance benefits of flash. Using APIs that are inherently designed for hard disks such as APIs that aggressively buffer and prefetch can actually negate the performance advantages of flash 75.

In the state-of-the-art, existing research has mainly looked at incorporating flash in update-heavy, online transactional processing (OLTP) workloads. Limited work has been done for leveraging flash in analytical processing (OLAP) workloads and no work exists for leveraging flash for Big Data SQL. It is a common misconception that OLAP workloads cannot leverage flash as they are mostly sequential in nature and also need to scan the entire table. However, extensive experiments in the disclosure, analysis of OLAP workloads and datasets, and results debunk this misconception. Accordingly, embodiments provide a flash-optimized serializer and deserializer (serde) for Big Data analytical query processing via FlashQueryFile 80.

Note that headings and subheadings are provided below for explanation purposes in order to aid in understanding. However, the headings and subheadings are not meant to be limiting.

I. Support/Rationale for Using Flash in Big Data Ecosystem

Flash is increasingly becoming common in the in the Big Data storage hierarchy. Flash offers a 40-1000× improvement in random accesses and a 2-7× improvement in sequential bandwidth compared to disks. Flash is nonvolatile, and hence, obviates the need to have data duplication. Flash can serve as the primary and only tier for the data. On the other hand, RAM's volatility mandates an additional durable copy of the data in a non-volatile medium, resulting in significant data duplication which is a big issue in Big Data systems. Flash allows much higher degree of IO parallelism for concurrent IO than disks as flash devices are built on an array of flash memory packages, which are connected through multiple channels to flash memory controllers. Logical blocks are striped over multiple flash memory packages allowing independent, concurrent data accesses. Flash's internal IO parallelism can be further leveraged for even higher performance.

Flash is less expensive than capacity-constrained RAM and is also better for being used as a second level cache than adding extra RAM. A large number of recent works, on making Hadoop faster for queries and iterative computing, are heavily dependent on very large RAM sizes. Flash can achieve much higher performance/$ than RAM as it allows much higher capacities than RAM at a much lower cost. Flash is also much more energy-efficient and energy-proportional than hard disks; further, making it an attractive choice for storage in Big Data clusters where a reduction in energy costs has a significant impact on the total cost of ownership. Furthermore, flash is very desirable for storing map output of Map Reduce jobs and increases performance by 3× of sort and other benchmarks that result in a significant amount of intermediate data.

Overall, high performance, small footprint, low power consumption, falling prices, and non-volatility of flash is making it highly desirable as a storage tier/cache in Big Data clusters, according to embodiments.

II. Opportunity for Fine-Grained Data Skipping

Figure 2A:
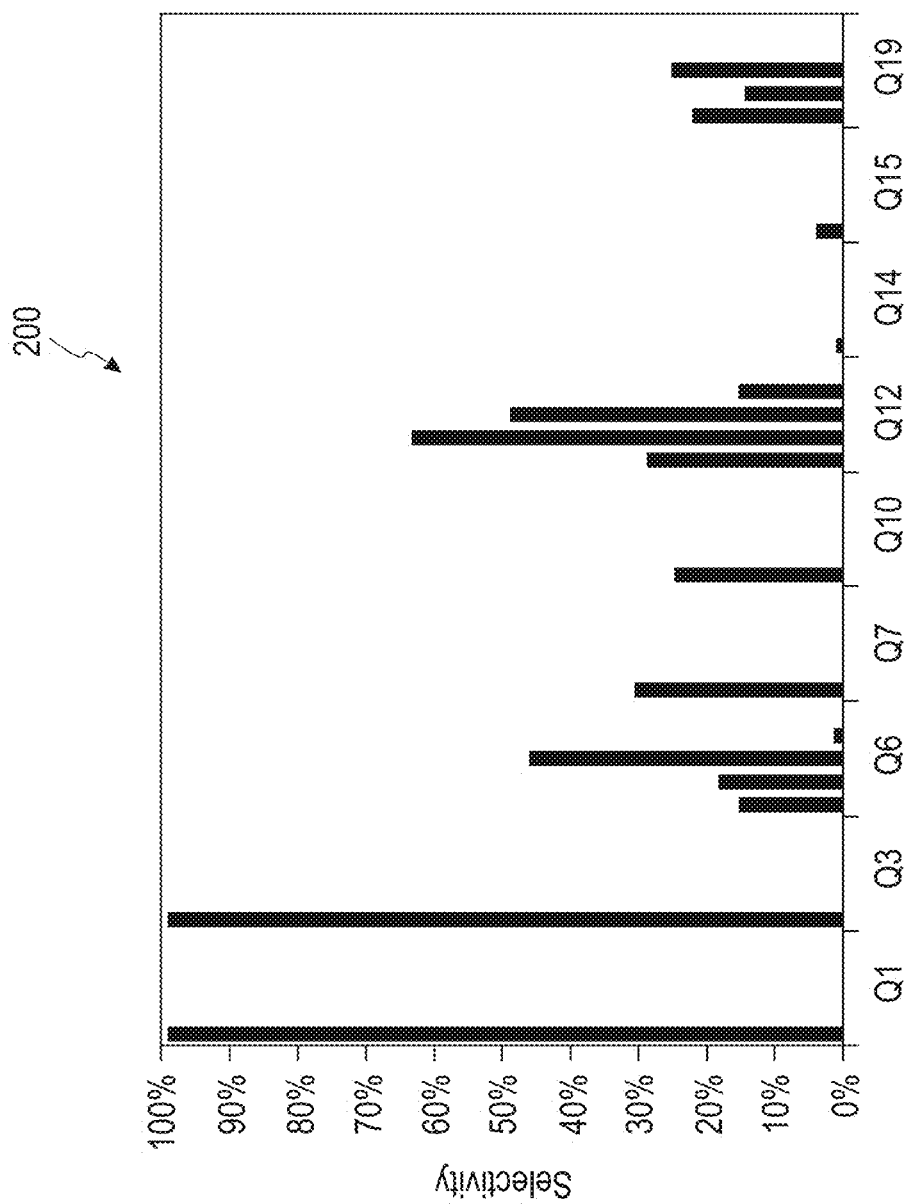
FIG. 2A is a graph that illustrates the selectivity of the individual selection columns in the TPCH queries.

FIG. 2 is a graph 200 that illustrates the selectivity of the individual selection columns in the TPCH queries. The graph 200 shows the rows that match the query predicate of each selection column in various TPCH queries. The selectivity of a column is the number of rows within that column matching the predicate of a query (Q). For example, if a given column has 100% selectivity, this means that every row in the column matches the predicate. If a given column has 25% selectivity this means that one quarter of the rows in the column match the predicate of the query.

One skilled in the art understands the predicate in an SQL query. For example, predicates are used in the search condition of WHERE clauses and HAVING clauses, the join conditions of FROM clauses, and other constructs where a (Boolean) value is required. A WHERE clause in SQL specifies that a SQL Data Manipulation Language (DML) statement should only affect rows that meet specified criteria. The criteria are expressed in the form of predicates. WHERE clauses can be used to limit the number of rows affected by a SQL DML statement or returned by a query. In brief SQL WHERE clause is used to extract only those results from a SQL statement, such as: SELECT, INSERT, UPDATE, or DELETE statement.

Figure 2B:
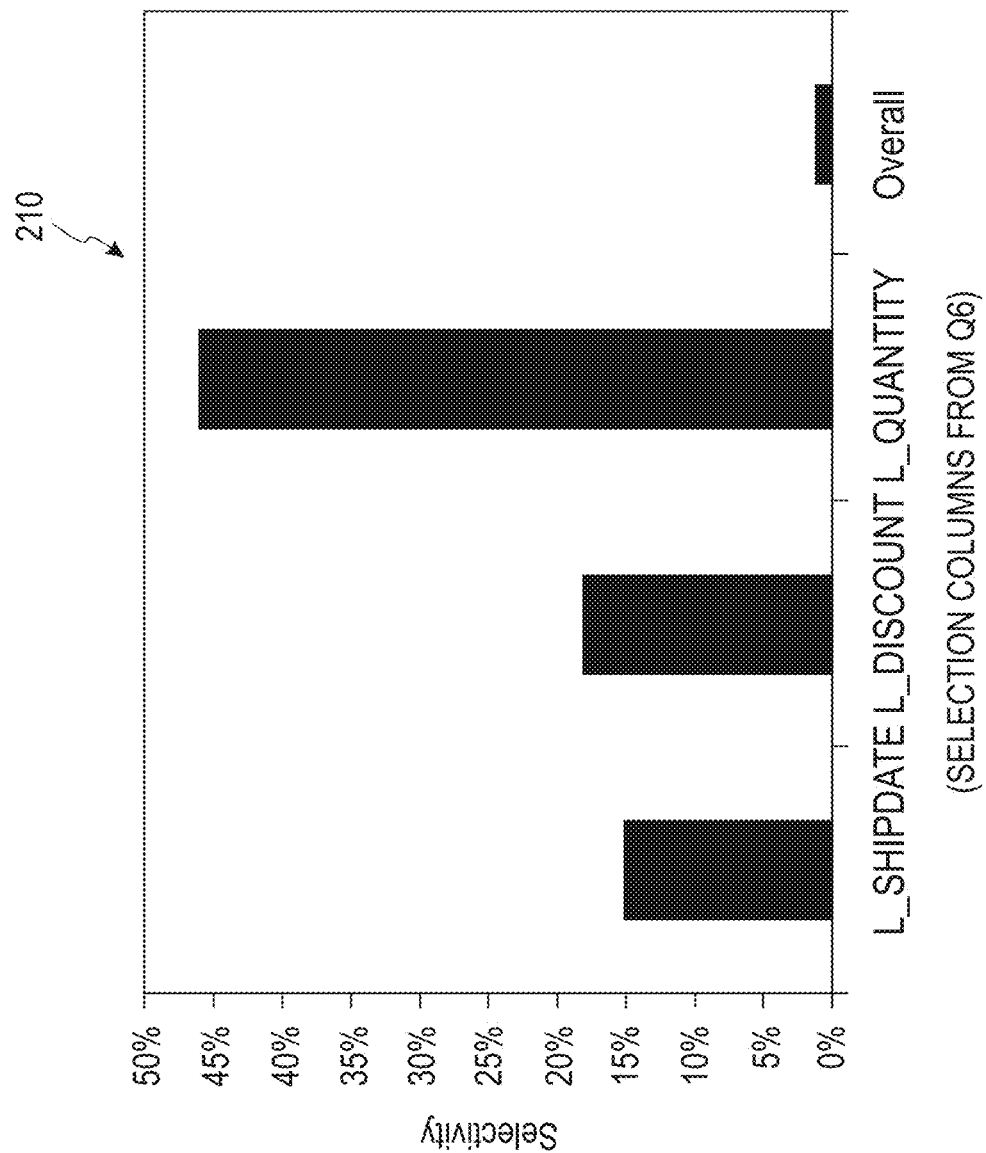
FIG. 2B is a graph that illustrates the selectivity of the individual selection columns from TPCH query 6.

In the graph 200, the x-axis shows the TPCH queries while the y-axis shows the percent (%) selectivity in each column. Assume that the TPCH Query 6 (Q6) is directed to a 79 GB (gigabytes) TPCH line item table with 600+ million rows. In the state-of-the-art, the current columnar and row-columnar serdes will read in all the data (i.e., all row positions) in the projections (e.g., L_EXTENDEDPRICE, L_DISCOUNT) and selection columns (e.g., with reference to graph 210 in FIG. 2B, L_SHIPDATE, L_DISCOUNT, L_QUANTITY are example selection columns from TPCH Query 6 in FIG. 2A). However, only 15% of rows in selection column L_SHIPDATE, 18% in L_DISCOUNT, and 46% in L_QUANTITY match individual column query predicates as represented in FIG. 2B. Only 1% of the rows match all the predicates across the three selection columns rendering only 1% data in projection columns L_EXTENDEDPRICE and L_DISCOUNT relevant to the query. Overall, only 16% data across the five columns is relevant to the query. Existing serdes may read as high as 99% of extra data from these projection columns just to project 1% relevant data and as high as 50% of extra data from the selection columns when the selectivity is less than 50%. Similar trend exists in other queries and the selectivity of selection columns ranges from 1%-63% for a majority of TPCH queries. Hence, an intra-row-group fine-grained data skipping technique that could read only the columnar data relevant to the query in both the selection and projection phase can lead to significant reduction in the data that needs to be read per analytical query (as disclosed herein).

III. FlashQueryFile

In this section, the disclosure describes the flash-optimized data layout, ingestion algorithm, selection algorithm, and projection algorithm of FlashQueryFile 80.

A. Data Layout

Figure 3:
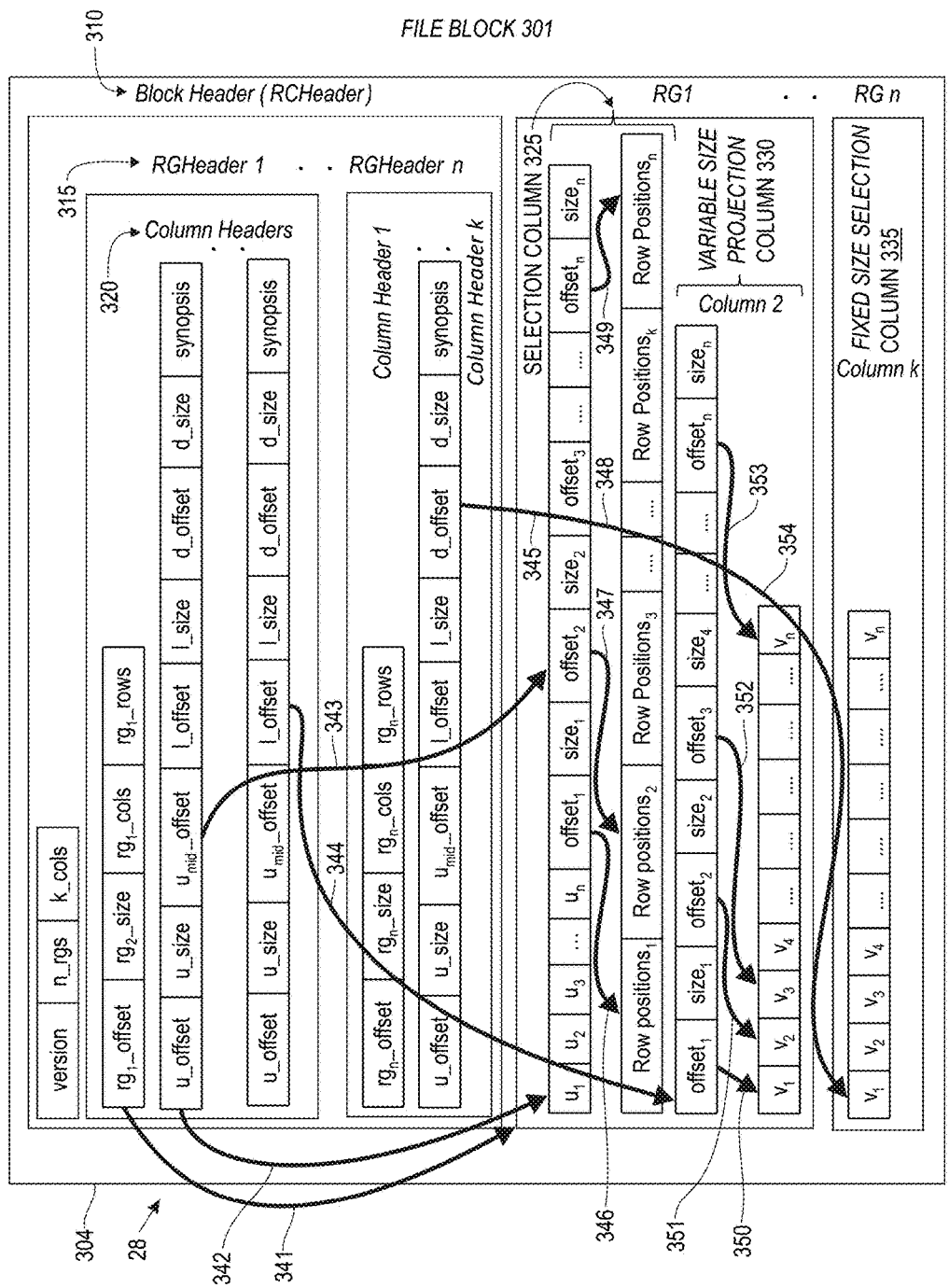
FIG. 3 illustrates how a table is logically represented as a single FlashQueryFile file/layout in distributed file system (DFS) blocks across the computer systems/servers in the node/cluster according to an embodiment.

FIG. 3 illustrates how a table is logically represented as a single FlashQueryFile file/layout 304 which is split (stored) into multiple distributed file system (DFS) blocks (by the FlashQueryFile 80) that are spread across the computer systems/servers 12 in the node/cluster 10 according to an embodiment. Although FIG. 3 shows a file block 301 stored in memory 28, the file block 301 represents numerous file blocks 301 distributed across multiple computer systems/servers 12 in the node/cluster 10. FIG. 3 also emphasizes metadata headers stored in the flash memory 75 as discussed below.

Accordingly, column in FlashQueryFile file/layout 304 is horizontally partitioned into multiple row groups, each containing a configurable number of rows. A file block 301 contains multiple row groups. FlashQueryFile 80 maintains metadata headers at three different levels: 1) block-level header called RCHeader, 2) row-group-level header called RGHeader, and 3) column-level header called ColHeader. The headers (i.e., RCHeader 310, RGHeader 315, and ColHeader 320) maintain data structures for facilitating fast random accesses to the necessary data and to allow fine-grained data skipping. The metadata headers RCHeader 310, RGHeader 315, and ColHeader 320 each include metadata the can be read by the FlashQueryFile 80 to determine when to skip an entire file block (and then move on to the next file block), skip a row group (and then move on to the next row group), and/or skip a column (and then move on to the next column), while executing a query (e.g., the selection phase/part of the query). As an example, a selection column 325, a low cardinality projection column 330, and a very high cardinality projection column 335 are shown.

The (file block) RCHeader 310 contains the number of row groups (n_rgs) in the file block and version number which aids the FlashQueryFile 80 software in maintaining backward and forward compatibility across various versions of the file block structure during the lifetime of deployment.

The RGHeader 315 header includes offset of the start of the row group in the file block (rg_offset) and size of row group in the file block (rg_size). The RGHeader 315 also contains the number of rows and columns present in the row group. For example, if the row group size is configured to be 10 million for a file block, the rg_rows field would contain 10 million as the value.

The ColHeader 320 maintains file offset pointers for various possible columnar layouts in the file block. The file offset and size of the dictionary of a column is maintained in u_offset and u_size respectively. The u_offset and u_size fields are populated for FlashQueryFile layouts that leverage dictionary (e.g., the selection dictionary and/or the projection dictionary) for fast projection and selection. The l_offset and l_size fields contain file offset of the lookup structure used in the projection-optimized layout. Fields d_offset and d_size contain file offset of data of columns that are stored as-is (for e.g., columns with cardinality=1 are stored as is without any dictionary). As executed by the FlashQueryFile 80, arrows 341, 342, 343, 344, 345, 346, 347, 348, 349, 350, 351, 352, 353, 354 illustrate relationships and uses of the metadata headers. The arrows 341-354 illustrate the relationship between an offset field and the data structure the offset filed is pointing to in the file block 301.

Data types in all the structures have been carefully selected keeping space-efficiency in perspective. FlashQueryFile 80 maintains two data layouts in FlashQueryFile file 304 (decided by an ingestion algorithm 102): one optimized for selection phase/part of a query and the other optimized for the projection phase/part of the query. As per observation of the experimenters, while the predicate values, and order and number of the columns changes across ad hoc queries, some columns do tend to be popular as either projection or selection columns. For example, in TPCH dataset, two columns, L_EXTENDEDPRICE (not shown) and L_DISCOUNT are the most popular projection columns. Their popularity is intuitive as TPCH is modeled as a financial benchmark; these numeric columns deal with money and aggregations can happen only on numeric values. Columns with date type such as L_SHIPDATE (in FIG. 2B) are very popular as a selection column as date is typically an important dimension in the analytical queries. Similarly, primary and foreign keys are popular selection columns. BlinkDB paper had a similar observation about selection columns based on their analysis of real-world queries from Facebook: 20% subset of columns occurred in the selection clause of 80% ad hoc queries. Based on this observation, FlashQueryFile 80 offers three data formats for columnar data: one format optimized for fast selection for popular selection columns, the other format optimized for the fast projection for popular projection columns, and a third format is a hybrid layout used for columns that are being used as projection and/or selection columns (different times in a query). The default layout is the hybrid format, where the administrator and/or a predictor module (in the FlashQueryFile 80) can choose a selection-only or a projection-only layout for better space-efficiency than the hybrid layout. Earlier analysis of industry traces has also found that the set of selection columns remains very predictable even in ad hoc analytical queries. Guided by such observations, FlashQueryFile 80 (via ingestion algorithm 102) optionally allows users and/or query engines to mark some columns in the table as columns that are only projected columns, only selected columns, and/or a combination of projected columns and selected columns. Accordingly, the FlashQueryFile 80 (via ingestion algorithm 102) leverages factors this information (i.e., the columns marked as in the table as columns that are only projected columns, only selected columns, and/or a combination) in its data layout decision for space efficiency (in the FlashQueryFile file 304). The ingestion time algorithm 102 is described in Table 1 below. Note that a primary key is a column or group of columns that uniquely identify a row. Every table should have a primary key, and a table cannot have more than one primary key. The primary key characteristic can be specified as part of a column definition, as in the first column of a table, or it can be specified as a separate clause of the CREATE TABLE statement. A foreign key is a column or set of columns in one table whose values must have matching values in the primary key of another (or the same) table. A foreign key is said to reference its primary key. Foreign keys are a mechanism for maintaining data integrity.

TABLE 1

Flash-Optimized Ingestion Algorithm

Require: rows to be ingested in the table, configurable number of rows
in each row group (RG) return Flash-optimized file block layout
  for all rows getting ingested do
    buffer rows in memory
    if number of buffered rows in memory = = RG size then
      populate fields of corresponding row group header RGHeader
        in block header RCHeader
      store offset in the file block of the new row group in RGHeader
      for all columns in the ingested rows do
        if column's destination has been designated as flash then
          use flash file block for storing this column's headers and data
        else
          use HDD file block for storing this column's headers and data
        end if
        if column has been designated as "selection only" then
          Determine min, max, mid, median, and average value and
          populate synopsis in the column header. Also store the sort
          order and cardinality of the column in the synopsis
          if column cardinality = 1 and column unsorted then
            sort columnar data
            create optimized dictionary which first stores the columnar
            data and then for each value in the data, it serializes the
            corresponding row position of the column
            mark u_offset and u_size entries in the column header to
            the offset of the columnar data
          else if column cardinality = 1 and column is sorted then
          serialize the columnar data as is to the file block
          store offset to the columnar data in the d_offset and d_size
          fields in the column header
          else if column is unsorted and cardinality < 1 then
          populate fields in the corresponding column header in the
          RGHeader
          determine set of unique values occurring in the columnar data
          determine row positions where each unique value occurs in
          the row group
          create data structure (henceforth, addressed as dictionary) that
          maintains a sorted array of each unique value, the array
          offset to the blob containing the row positions pertaining to
          the unique value
          serialize the data structure to the file block
          store the file block offset and size of the serialized data
          structure in the u_offset field in the column header
          store the file block offset of the middle value of the column TABLE 1-continued Flash-Optimized Ingestion Algorithm

```
                in the serialized data structure in the u_mid_offset field
                in the column header
                else if column is sorted and cardinality < 1 then
                identify the unique values and create a dictionary
                skip the dictionary sort step as data is already sorted
                identify ranges of row positions for each unique value
                store the row position blobs for each unique value as a
                structure containing start and end row position pertaining to
                the value.
                For every unique value, store an offset to the row position
                structure
                Set the u_offset and u_size fields in the column header to
                the dictionary offset
            end if
            if column has been designated as "projection only" column then
                if column is sorted and cardinality < 1
                identify the unique values and create a dictionary
                store the file block offset and size of the dictionary in the
                u_offset and u_size field in the column header
                identify ranges of row positions for each unique value
                create an optimized lookup structure which stores start and
                end row position pertaining to each value in the dictionary.
                Store the l_offset and l_size of the lookup structure in the
                column header
                else if column is sorted and has cardinality == 1 then
                Serialize the column data as is to the file block
                store the file block offset and size of the data in the d_offset
                and d_size field in the column header
                else if column is unsorted and has cardinality << 1 then
                identify the unique values and create a dictionary
                store the file block offset and size of the dictionary in the
                u_offset and u_size field in the column header
                create lookup structure that maps each row position in the
                column to the directory index of its value
                store lookup structure's offset in the l_offset and l_size
                field of the column header
                else if column is unsorted and cardinality > threshold
                serialize the data of the column to the file block
                store the file block offset and size of the data in the d_offset
                field in the column header
                if column is variable length then
                    create lookup structure that stores file block offset and
                    size of each row value in the column
                    serialize the lookup structure to the file block
                    store file block offset and size of lookup structure in
                the l_offset and l_size fields of the column header
                end if
                else if column is both selection and projection column
                repeat steps earlier albeit in a much more space-efficient
                manner to reduce redundancy between the projection and
                selection data structures
            end if
        end for
    end if
    if number of Row Groups == Rows Groups allowed per file block
    then serialize the main block header RCHeader to the designated
    offset in the file block
    start a new file block
    end if
end for
```

Figures 4A, 4B:
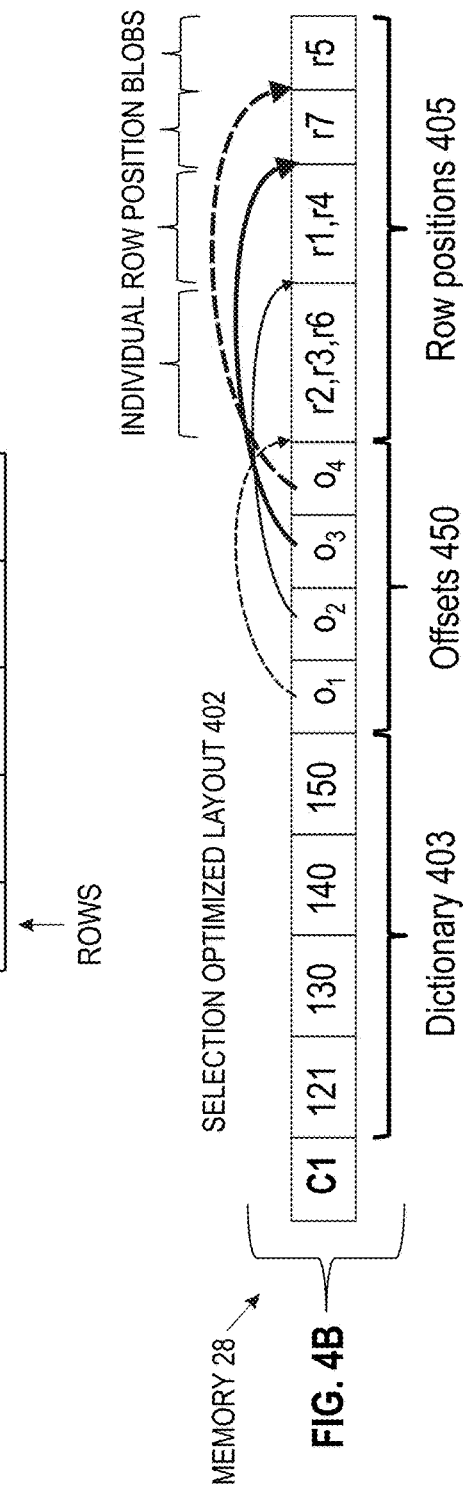
FIG. 4A illustrates the original relationship of columns and rows having data values in a table.
FIG. 4B illustrates a selection optimized layout for selection columns according to an embodiment.
Figure 4C:
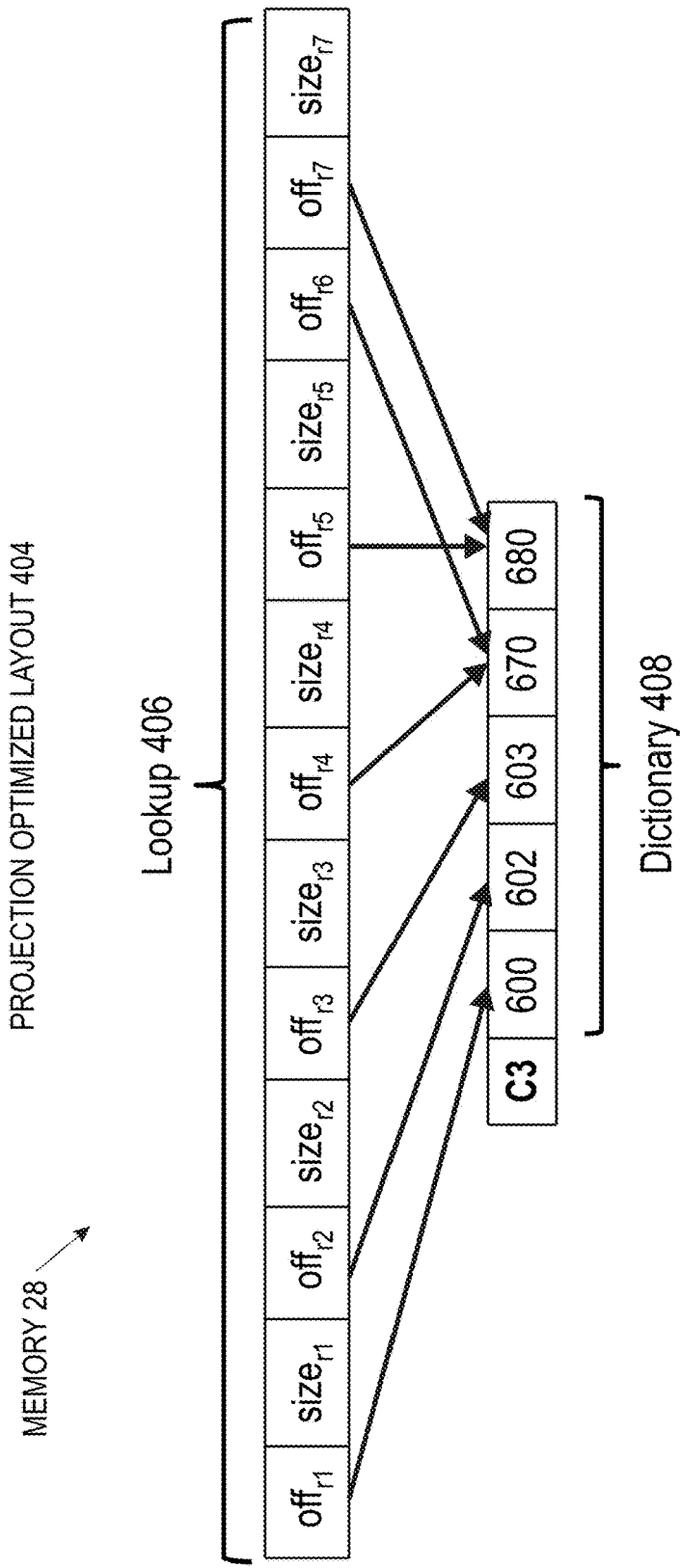
FIG. 4C illustrates a projection optimized layout for projection columns according to an embodiment.

1) Selection Optimized Data Layout:

FIG. 4A illustrates the original relationship 401 of columns and rows having data values in a table. The table is ingested into the computer systems/servers 10 by the FlashQueryFile 80 to be optimized for flash memory according to embodiments. Embodiments do not store the table in the original relationship. According to embodiments, FIG. 4B illustrates a (basic) selection optimized layout and FIG. 4C illustrate a (basic) projection optimized layout for a variable sized popular projection column. According to implementations, FIGS. 4B-4I are example layouts and show further details and particular examples of the file block 301 in FIG. 3. According to an embodiment, from the original relationship 401 of the table in FIG. 4A, a selection optimized data layout 402 shown in FIG. 4B has been designed (by FlashQueryFile 80 for storage) to facilitate fast predicate match and to reduce data read during the selection clause/part (e.g., the where clause containing the predicate). For each potential selection column, FlashQueryFile 80 extracts the unique values occurring in each row group of the column and stores the unique values contiguously in selection dictionary 403. Column header maintains an offset (off) to the start of the unique values. Next, for each value, FlashQueryFile 80 stores offsets 450 (abbreviated off and/or O) and length (i.e., size) of the set of row positions where each unique value occurs in the column (not shown in FIG. 4B but shown in FIG. 3). Finally, FlashQueryFile 80 stores the sets of row positions for each unique value in row positions designation 405. The offsets 450 correspond to the location of each gathering/grouping of row positions for an individual unique value. In the metadata header, FlashQueryFile 80 also keeps track of (stores) maximum, minimum, mid, average, and count of the entries in the column per row group. Maximum refers to the maximum value, minimum refers to the minimum value, mid refers to the middle value, average refers to the average value occurring in every row group of a column. Count refers to the number of rows in the row group of the column.

As compared to the original relationship table 401 in FIG. 4A, selection optimized data layout 402 is the new way to store column C1 without having to repeat storage of the same data values. FIG. 4B shows an example in which the selection dictionary 403 (in the column header) stores the unique data values for column C1, and the unique data values are 121, 130, 140, 150. The row positions designations 405 (in the column header) stores the row position (i.e., name) for each row position in column C1 that contained the unique values in the original relationship 401. For example, the unique data value 121 is in row positions r2, r3, and r6 (for the original relationship) in the row positions designations 405, but the unique value 121 is only stored once and is not duplicated for the 3 different row positions. The unique data value 130 is represented as being in row positions r1 and r4 (in the row position blob) in the row positions designations 405. The unique data value 140 is represented as being in row positions r7 (in the row position blob) in the row positions designations 405. The unique data value 150 is represented as being in row position r5 in the row positions designations 405. Each row position blob is a gathering of the one or more row positions that are represented as have the same unique value. Each one of the offsets 450 is to the start of a particular row position blob.

In this example, assume that the FlashQueryFile 80 selects column C1 as one selection column for the selection optimized layout 402. FlashQueryFile 80 determines the unique values occurring in each row group in the column C1 to be unique values 121, 130, 140, 150 and stores these unique values contiguously in memory 28. Unique means the FlashQueryFile 80 only needs a single entry of each unique value in selected column C1 without having to repeat storage of the same value in column C1. FlashQueryFile 80 configures the column header to store an offset (off) to the start of the unique values, such as to the start of the first unique value 121. Since the FlashQueryFile 80 stores offset 450 and length (i.e., size) of the set of row positions where the each value occurs in the column, the FlashQueryFile 80 can determine the exact location of the data for each of the unique values 121, 130, 140, 150 (which are stored side-by-side in memory 28).

2) Projection Optimized Data Layout:

As taken from (ingested) the original relationship table 401, FIG. 4C illustrates the projection optimized data layout 404 (stored in memory 28) used for variable length columns that are only used for projection, i.e., appear in the select clause. If the column is variable length, FlashQueryFile 80 maintains a lookup structure 406 that contains the offset and the size of each row position in the column. The column data is then laid out in a dictionary 408 if the cardinality of the column is low. Otherwise, the data is simply laid sequentially on the file system block. The column header maintains the offset of the lookup structure 406 and the data (value). If the (particular) column is fixed-length, no lookup structure is used and data is simply sequentially laid out in the file system block. FlashQueryFile 80 keeps track of the field length in the column header to assist in later lookups.

As compared to the original relationship table 401 in FIG. 4A, projection optimized data layout 404 is the new way to store column C3 without having to repeat storage of the same data values. For example, a projection dictionary 408 stores (only) the unique data values 600, 602, 603, 670, 680 (i.e., without repeating any data values). The lookup structure 406 stores the offset (off) in memory and the size (e.g., bytes, kilobytes, etc.) of each data value. Since data value 600 appears in column C3 only once (i.e., only in row 1), data value 600 has an $off_{r1}$ (offset) and $size_{r2}$ in the lookup structure 406. However, data value 670 appears in column 3 twice, in both row 4 and row 6; accordingly, the lookup structure 406 represents row 4 by storing $off_{r4}$ and $size_{r4}$ and also represents row 6 by storing $off_{r6}$ and $size_{r6}$. The data value 670 is only stored once in the projection dictionary 408 to correspond to two separate rows 4 and 6, thus saving space and making it easier to determine if there is a match of data value 670 (and how many rows match in column C3 by scanning the lookup structure 406 (i.e., metadata) without having to actually scan every single data value in column 3).

3) Further Example Selection and Projection Optimized Data Layouts

Figure 4D:
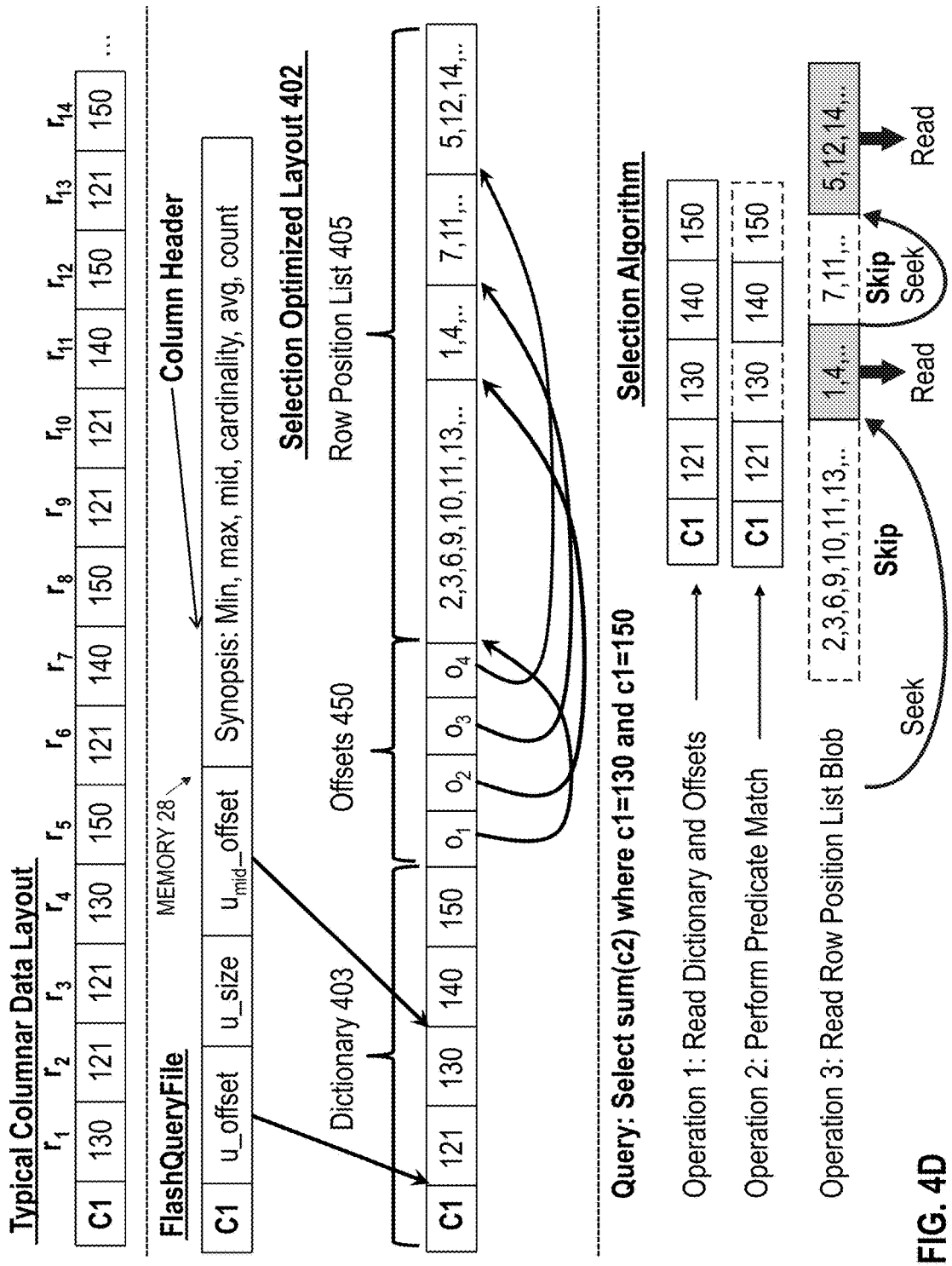
FIG. 4D illustrates an example of utilizing the selection optimized layout according to an embodiment.

FIG. 4D illustrates an example of the utilizing the selection optimized layout 402 (of FlashQueryFile 80) according to an embodiment. FIG. 4D shows a typical columnar data layout that shows the data values in each row position (r1-r14) (with additional data values of column C1 from the original relationship 401) versus the selection optimized layout 402. FIG. 4D assumes a query: Select sum(c2) where c1=130 and c1=150. The selection algorithm of the FlashQueryFile 80 reads the dictionary 403 and offsets 450 from the selection optimized layout 402. The selection algorithm of the FlashQueryFile 80 performs the predicate match of C1=130 and C1=150. Finally, the selection algorithm of the FlashQueryFile 80 (only) reads (seeks to) the row positions list 405 that match and skips the row positions in the row position list 405 that do not match. The determined row positions are passed to the projection algorithm of the FlashQueryFile 80.

Figure 4E:
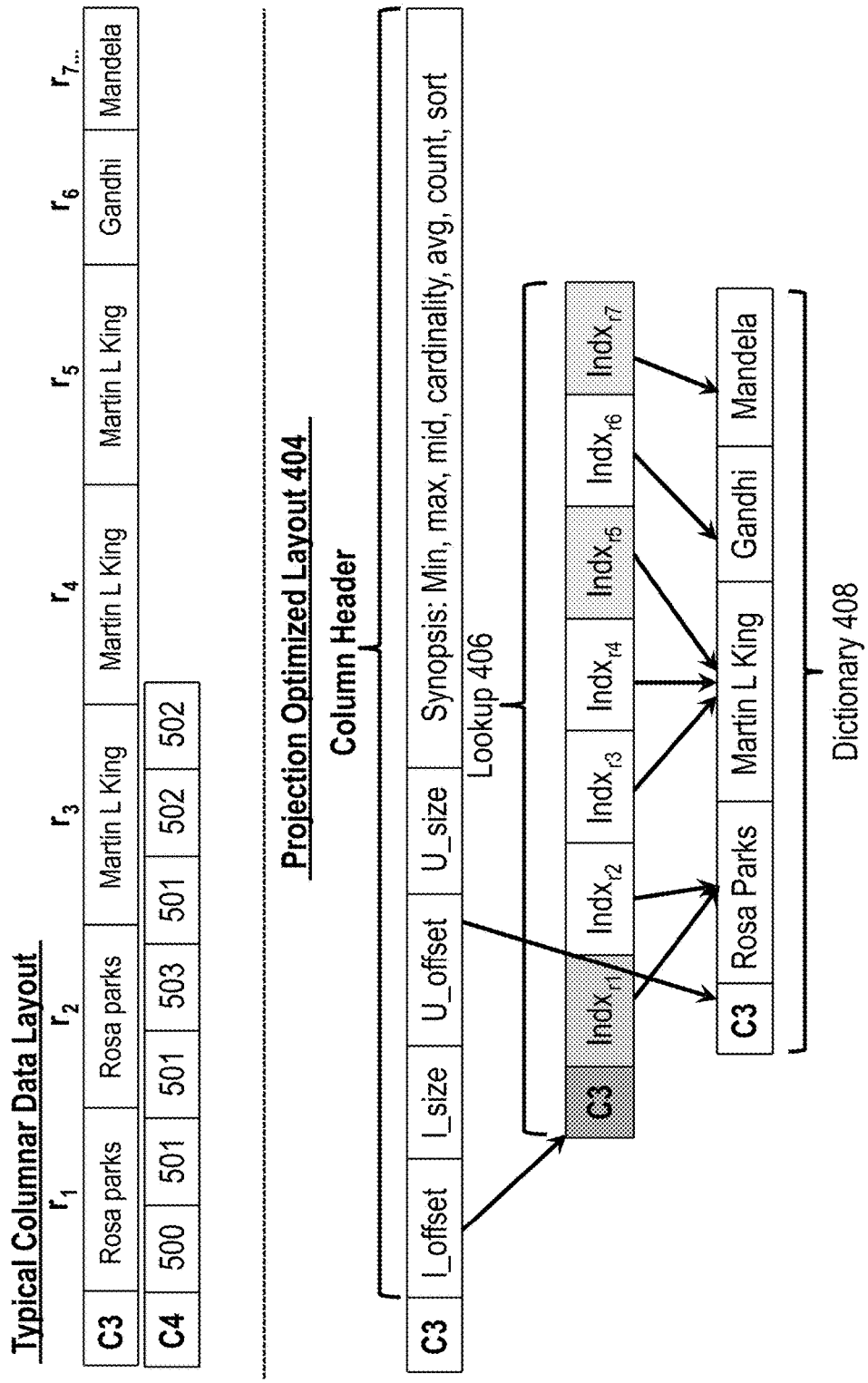
FIG. 4E illustrates an implementation of the projection optimized layout for low/medium cardinality columns according to an embodiment.

FIG. 4E depicts an implementation of the projection optimized layout 404 for low/medium cardinality columns (of FlashQueryFile 80) according to an embodiment. Low and medium cardinality columns have a cardinality that is lower than high cardinality columns. Low cardinality columns have a cardinality value that is lower that medium cardinality columns. A dictionary 408 is created to store all the unique values occurring in the columnar data (for columns C3 and C4). Next, a lookup structure 406 is created with indexes that maps each row position's column value to the dictionary value. In FIG. 4E, note that the indexes are utilized in the lookup structure 406 to map to each entry in the dictionary 408 without using the offset and size shown in FIG. 4C. Within the lookup structure 406, the $index_{r1}$ and $index_{r2}$ both map to the unique value Rosa Parks in the dictionary 408. The l_offset and l_size fields in the column header are set to point to the file offset of the serialized lookup structure in the file block 301. The u_offset and u_size fields are set to point to the serialized dictionary in the file block 301.

In FIG. 4E, the projection algorithm of the FlashQueryFile 80 is configured to receive input (from the selection algorithm) of the list of rows matching all predicates and the list of rows positions are r1, r5, and r7. The FlashQueryFile 80 is configured to read in the dictionary 408 (of unique values). FlashQueryFile 80 is configured to lookup (and retrieve) the dictionary value at the index stored in the lookup table structure 406 for each desired row position (such as r1, r5, and r7).

Figure 4F:
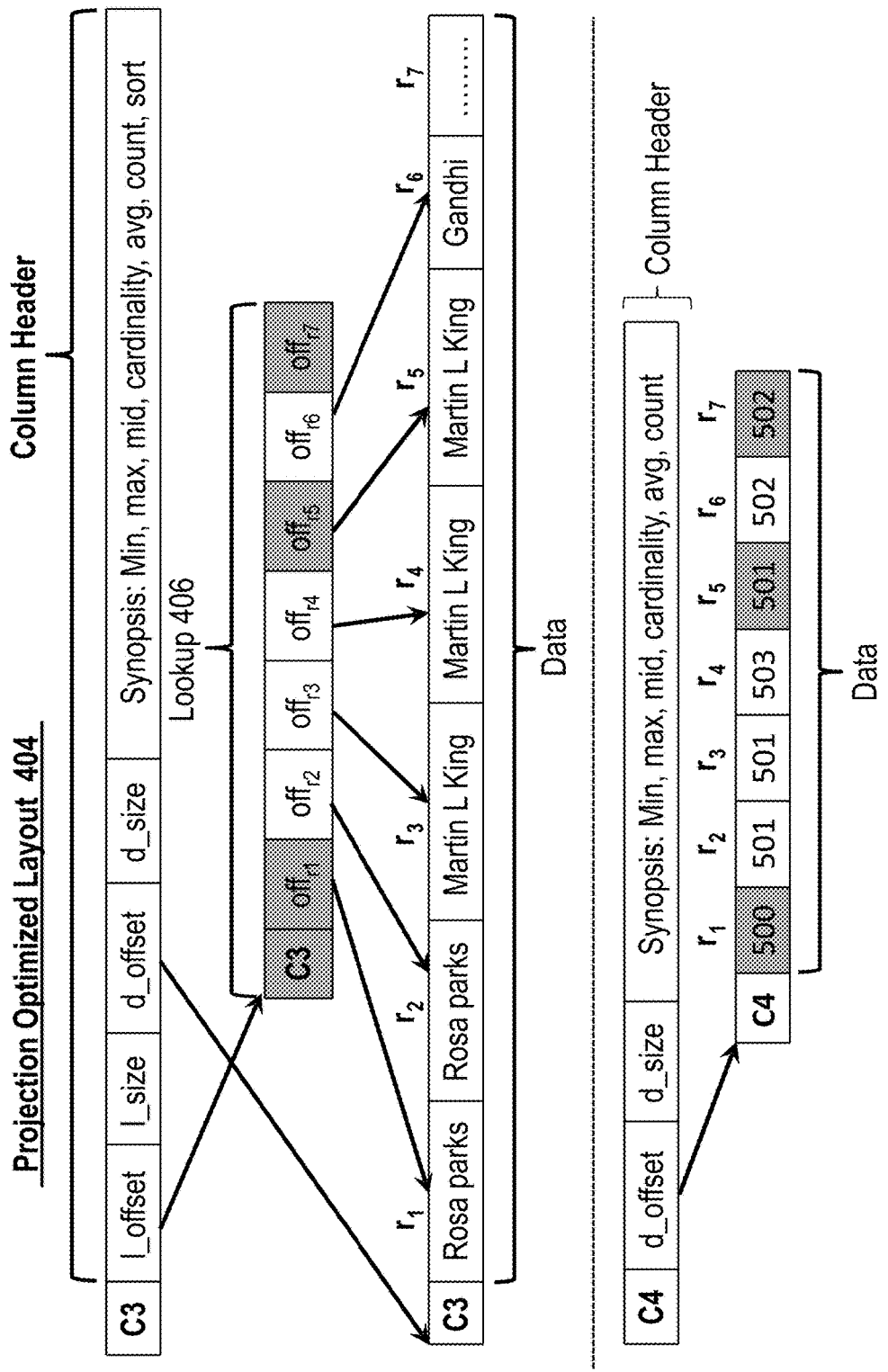
FIG. 4F illustrates an implementation of the projection optimized layout for high cardinality columns according to an embodiment.

According to another embodiment, FIG. 4F depicts another projection optimized layout 404 for high cardinality columns. No dictionary is used in this case for space-efficiency and performance reasons. The columnar data is serialized as to the file block 301, and the lookup structure 406 stores the offset (e.g., $off_{r1}$, $off_{r2}$, etc.) of the column value at each row position for columns with variable length columns (as represented for column C3). When the column has a high cardinality and fixed length, column C4 is the example representation. The l_offset and l_size fields in the column header are set to point to the file offset of the serialized lookup structure in the file block 301. The d_offset and d_size fields are set to point to the serialized columnar data in the file block 301.

In FIG. 4F, the projection algorithm of the FlashQueryFile 80 is configured to receive input (from the selection algorithm) of the list of rows matching all predicates, and the list of rows positions are r1, r5, and r7. If the column has a variable length, the FlashQueryFile 80 is configured to read individual lookup element (in the lookup structure 406) as one option or cluster the row positions and read a chunk (a group of elements) of lookup structure 406. FlashQueryFile 80 is configured to calculate the file offset of the value of a row position by adding d_offset (from the column header) to the off (offset) stored in lookup structure 406. If the column has a fixed length, FlashQueryFile 80 calculates row position offset as d_offset+row pos*field length. FlashQueryFile 80 is configured to read entries marked grey (i.e., highlighted) directly from flash and skip reading rest of data.

Figure 4G:
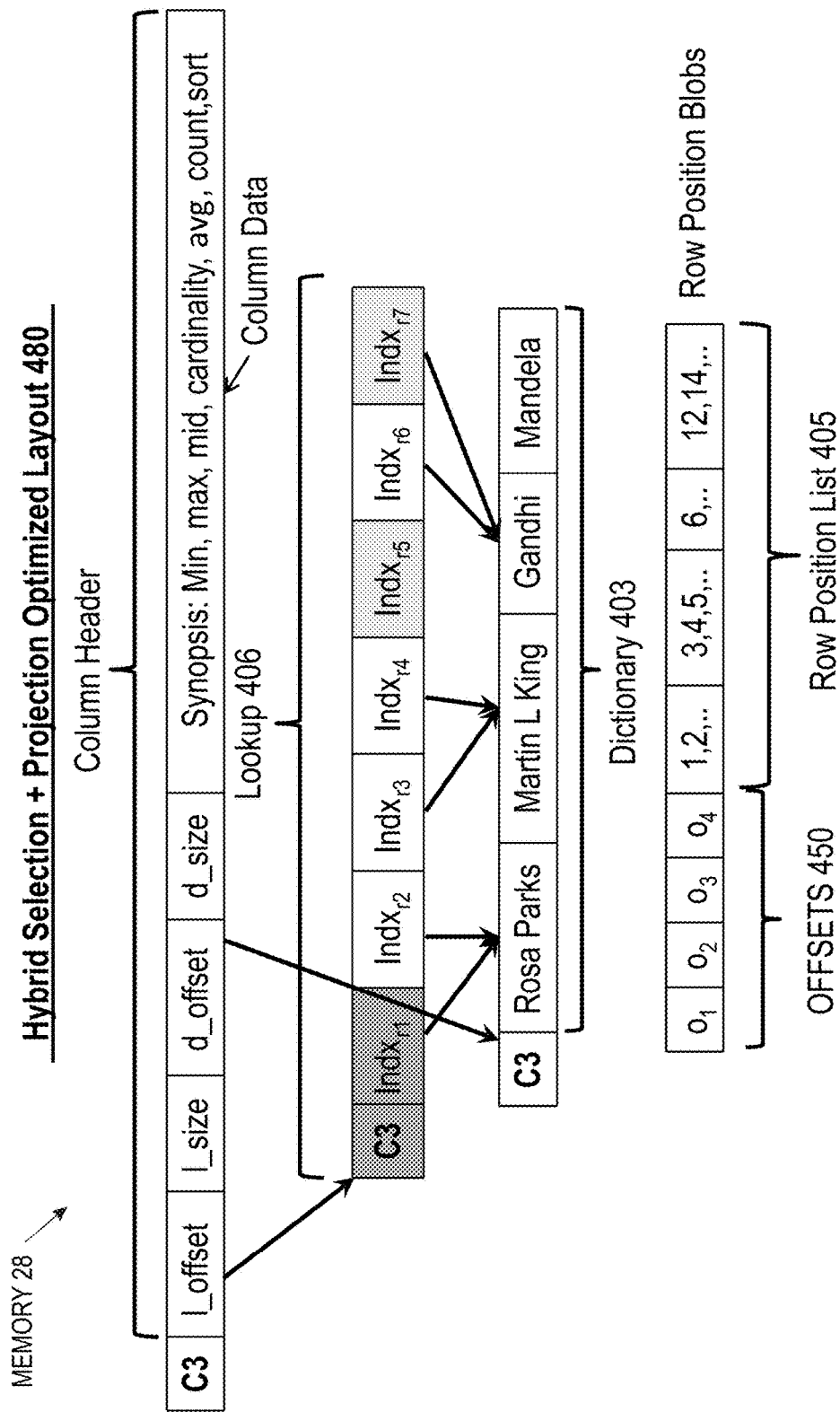
FIG. 4G illustrates a hybrid projection and selection layout for columns that can be used as both projection and/or selection columns according to an embodiment.

According to an embodiment, FIG. 4G depicts a hybrid projection and selection layout 480 for columns that can be used as both projection and/or selection columns depending on the query. FIG. 4G depicts a layout with a combination of the selection and the projection optimized layouts (402 and 404).

Figure 4H:
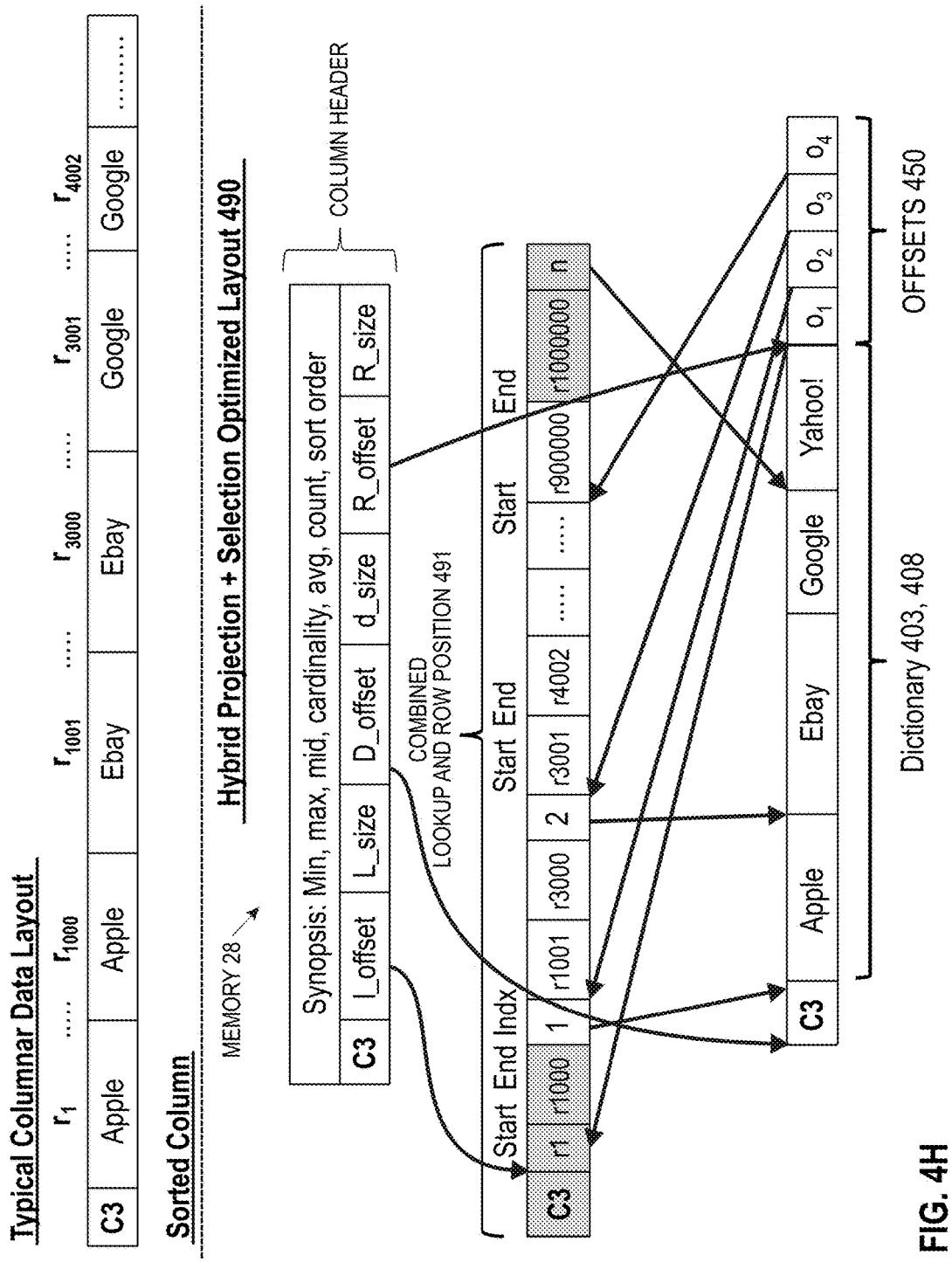
FIG. 4H illustrates an optimized and space-efficient projection and selection layout for columns that can be used both as projection and/or selection columns according to an embodiment.

According to an embodiment, FIG. 4H depicts an optimized and space-efficient projection and selection layout 490 for columns that can be used both as projection and/or selection columns depending on the query. This combined layout 490 can be used only if the column is sorted. Instead of maintaining a lookup entry for each and every row position in the lookup table, only the start and the end row positions are tracked in the lookup table 491. The lookup table 491 serves as a row position blob for each unique value in the dictionary 403, 408 by marinating a reverse pointer to the lookup entry corresponding to each unique value.

Figure 4I:
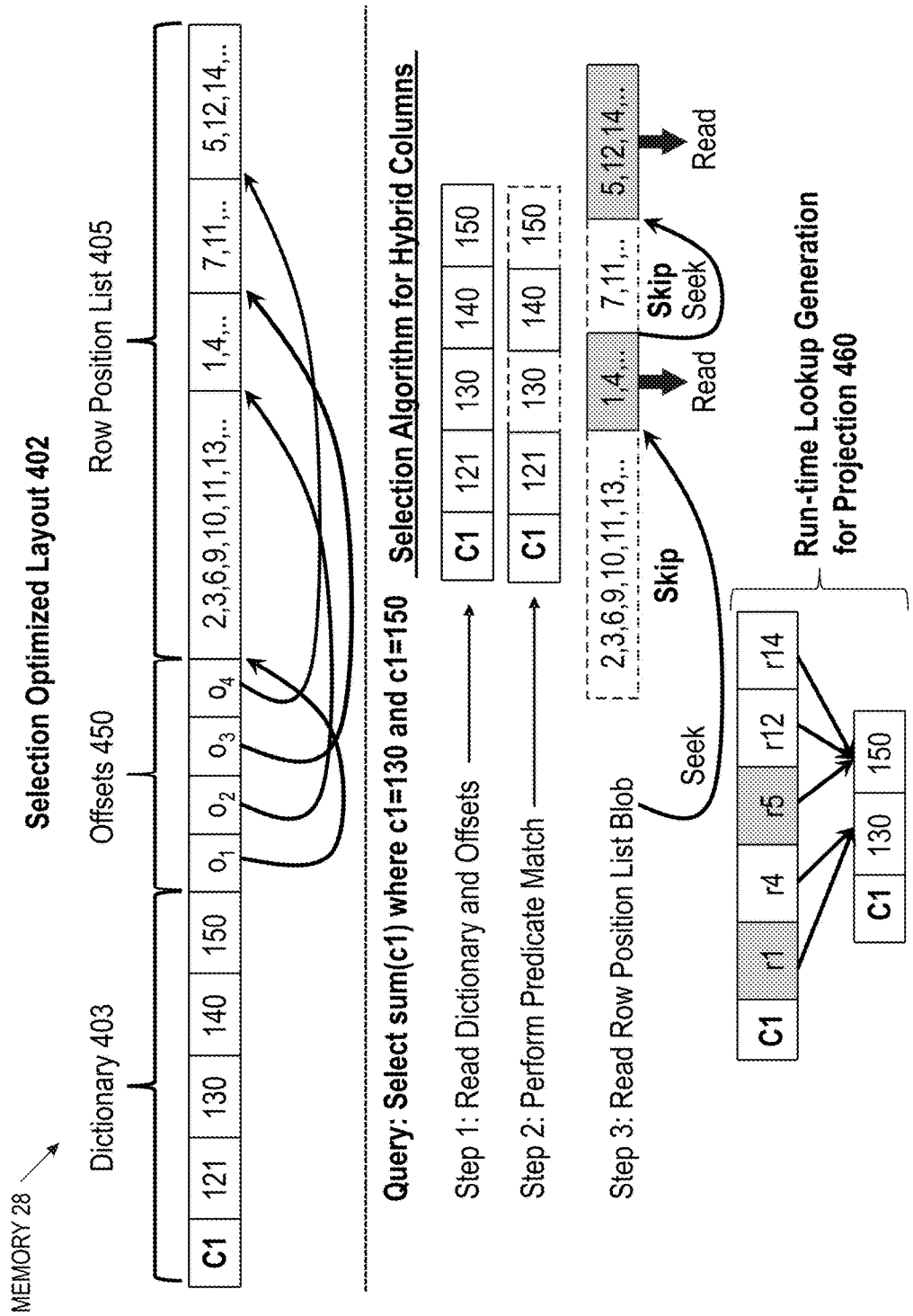
FIG. 4I illustrates an example of a column that is popular both as a selection and projection column and stored in the selection optimized data layout according to an embodiment.

FIG. 4I illustrates a different example of utilizing the selection optimized layout 402 (of FlashQueryFile 80) according to an embodiment. According to an embodiment, FIG. 4I depicts a mechanism to optimize the projection phase (of a query) even if the query were to use a column laid out in the selection optimized layout 402 as the projection column in the same query. For example, FIG. 4I illustrates an example of a column that is popular both as a selection and projection column (which may be referred to as a hybrid), and the FlashQueryFile 80 stores this hybrid column (used as both a selection and projection column) in the selection optimized data layout 402 according to embodiments. The rationale being that selection processing happens before projection processing in FlashQueryFile 80. The lookup structure (460) needed by the projection algorithm is dynamically created during run-time query processing. The selection algorithm yields column values and the associated row positions that match the predicate. The reverse lookup structure 460 is created from this distilled information that maps row positions to the values. The lookup structure 460 is then used during the projection phase to project values pertaining to the row positions of interest as further discussed in the projection optimized data layout herein.

In FIG. 4I, the projection algorithm for hybrids (of the FlashQueryFile 80) is configured to receive input (from the selection algorithm) of the list of rows matching all predicates which are predicates column c1=130 and column C1=150. The FlashQueryFile 80 receives input of the list or rows matching the predicates, and reads the entries (marked grey/highlighted) directly from the in-memory lookup (e.g., dictionary 403) and skip reading the rest of the data.

B. Flash-Optimized Selection Algorithm

FlashQueryFile flash-optimized selection algorithm 104 (also referred to as scan algorithm) is optimized for flash and leverages random accesses and internal parallelism made possible in flash for performance as described above. FlashQueryFile 80 is designed with the goal of reading minimal possible data as fast as possible. Flash (e.g., flash memory 75) allows much more internal parallelism in concurrent IO operations than hard disk drives (hard disk drive 34), and FlashQueryFile 80 leverages the parallelism possible in flash by using flash-optimized selection algorithm 104 (scan algorithm). State-of-the-art RCFile and ORCFile read each row-group serially, while FlashQueryFile 80 reads each row-group in parallel (i.e., at the same time). In addition, the row position blobs of the column values that match the predicate are also read in parallel. A final intersection of the row positions that match all the predicates is then passed to a projection algorithm 106.

Now, to illustrate the selection algorithm 104 operations consider the following query: select avg(a), sum(b) from the table where c=5 and d>10. Note that there are columns a, b, c, and d in the table. In this example query, the projection part/phase is select avg(a), sum(b) from the table while the selection part/phase is where c=5 and d>10. In this query, the predicate is c=5 (i.e., 5) for column c, and the predicate is d>10 (i.e., >10) for column d.

FlashQueryFile's selection operator first reads in the block header (RCHeader). RCHeader contains the statistics about the max and min values of all columns per row group. All the row groups where column c's max value is <5 or min value is >5 along with where column d's max value is <10 are skipped. The columns c and d are then ranked based on their cardinality. The column with lower cardinality is evaluated first. The underlying rationale for the ordering is to minimize data reads. It is assumed that c is the column with low cardinality here as will be understood from the following discussion. For each remaining row groups, FlashQueryFile 80 spawns threads in parallel that deserialize and read in the data structure containing unique values of the column c. A predicate match (process/operation) is performed against the unique values of the column c, and if the predicate (i.e., column c=5) matches one or more unique values, the row position blobs pertaining to the matching unique values are read in parallel. The rest of the row position blobs are skipped, resulting in significant reduction in data reads if the selectivity of the query is low for the selection column under consideration. If predicate does not match (for, e.g., column c=5), the predicate match operation is skipped for column d for the (particular non-matched) row group, resulting in a significant reduction in data reads (all row position blobs reads of column c, dictionary read for column d and row position blobs read for column d will get skipped from reading). An intersection of row positions that match both c's and d's predicates is noted and stored. In contrast, current state-of-the-art file formats read the entire data of columns c and d (without skipping as discussed herein).

Continuing the scenario, when the predicate of column c=5 is matched with unique values in the matched/identified row groups, the predicate match operation is then run against the unique values of the column d, and if the predicate (i.e., column d>10) matches one or more unique values, the row positions pertaining to the matching unique values are read in parallel.

The approach in embodiments significantly reduces the data that needs to be read in the selection phase read requirements in several scenarios:

1) predicate does not match some of the unique values. In this case, the selection algorithm is configured to skip over reading the row positions for the unique values that do not match the predicate;

2) column is sorted and has high cardinality. In this scenario, a large number of row groups can be skipped; and 3) cardinality of selection column is low and selectivity is also low. This scenario results in smallest amount of data read during selection. The dictionary of unique values is much smaller than actual column data because of low cardinality. If very few values match the predicate, a large majority of row position blobs will get read, resulting in significant data reduction. Row position blobs refer to a variable-length set of row positions pertaining to a unique value. Note that the cardinality of a set (or column) is a measure of the number of distinct or unique elements of the set (or column).

Table 2 illustrates an example of flash-optimized selection algorithm 104.

TABLE 2

Flash-Optimized Selection Algorithm:

Require: Query predicate and tabular data
Return: Set of row positions that match the all the query predicates
  At the time of submission of a new query
  Identify the selection and projection columns in the query
  Fetch the main block header RCHeader from the FlashQueryFile block.
  Cache it for future queries
  for all each row group in the FlashQueryFile block do
    for all each selection "where" column do
      Retrieve the column's header from RCHeader
      Compare the predicate with the min and max value stored in the
      column header if predicate is smaller than min or greater than
      the max then
        Skip the row group from processing completely by
        marking it skipped;
      end if
    end for
    for all each remaining row group that needs to be processed do
      Spawn a thread to process the row group TABLE 2-continued Flash-Optimized Selection Algorithm:

```
        Retrieve the column header from RCHeader
        Sort the predicates for the column
        if lowest predicate value > mid value of column then
            Retrieve the block offset (u_mid_off set) of the dictionary
        else
            Retrieve the block offset (u_off set) of the dictionary
        end if
        Fetch dictionary from the offset determined in earlier step
        Match the predicate value to the unique values in the column
        if predicate matches some of the unique values then
            Identify the offset of the data block containing the row positions
            Individually fetch each blob containing row positions or
cluster the fetch of the row positions
            Find intersection of row positions that satisfy all the predicates
        end if
    end for
end for
```

C. Flash-Optimized Projection Algorithm

The flash-optimized projection algorithm 106 is invoked after the selection algorithm 104 courtesy of late materialization in place in FlashQueryFile 80. Late materialization is used in FlashQueryFile 80 to limit the data that needs to be read during the projection phase (e.g., select avg(a), sum(b) from the table) to only the relevant row positions by first executing the selection phase (where c=5 and d>10). The projection algorithm 106 receives the final set of row positions that match the predicate (e.g., rows where c=5 and d>10) as determined in the earlier operations of the selection phase. If the selectivity (i.e., number of rows within the given column that match the predicate) is lower than a configurable threshold, FlashQueryFile 80 calculates/determines the file offset of the desired row position in the projection columns, and does a point read of the value at the offset. The FlashQueryFile 80 then returns the answer to the query. The selectivity threshold is configurable and can be changed based on the workload. As one example, the default selectivity threshold value may be 1.5%. This default selectivity threshold of 1.5% means that if the number of row positions matching all the predicates is less than 1.5%, the point read (by the FlashQueryFile 80) is used to read the data. For query selectivity higher than 1.5%, a clustered approach will be used. In the example, the projection algorithm is configured to return the average of the values of column a and the sum of values of column b that occur at the set of row positions (previously) determined by the selection algorithm. If the selectivity is equal to and/or greater than the configurable threshold, FlashQueryFile 80 clusters (i.e., aggregates) the row positions and reads values of a configurable number of row positions in one file system call. The FlashQueryFile 80 then returns the answer to the query. This technique reduces the data read significantly if the selectivity of the query is low, i.e., very few row positions match the predicate. In contrast, state-of-the-art file format scan operators read the entire data of columns a, b upfront (but not FlashQueryFile 80). If selectivity is 0.01%, as an example, the state-of-the-art approach results in unnecessary read of 0.99% column's data. Randomly accessible storage mediums such as flash are a key enabler for making such targeted random reads possible without a performance impact.

Table 3 illustrates an example of flash-optimized projection algorithm 106.

TABLE 3

Flash-Optimized Projection Algorithm

```
Require: Set of row positions that match all the query predicates
Return: Projection of the desired attributes from database matching
the predicates
    for all columns to be projected do
        if projection column is variable length
        for all each row group that has any of the row positions found in
        Step do
            if row positions are not clustered together then
                Examine the column header and identify the offset of the lookup
                    data (l_off set) structure and offset of data (l_data)
                Deserialize and read lookup structure from l_offset in the
                    file block
                Determine index of the row position in question in the lookup
                    data structure.
                Each element in the lookup structure is fixed length and index
                    is determined by multiplying desired row position with size of
                    each lookup element.
                    If column cardinality is low
                        Lookup structure element contains index in the dictionary of
                            the column value pertaining to the row position
                        Read in contents of the dictionary
                        Read column value from specified index in the dictionary
                    else
                        Lookup structure element contains file offset of the column
                            value of the desired row position in the file block
                        Seek to the file offset and read the column value
            else
                Use a more clustered read algorithm
                Sort the inputted set of row positions that match all query
                    predicated
                Determine the index in the lookup structure for the first row
                    position in the set.
                Determine offset of columnar data pertaining to first row
                    position in the set
                Read projection buffer worth of data from the file block starting
                    at the offset determined in the earlier step
                Continue reading till columnar value pertaining to last row
                    position in the input set is read
            end if
        end for
    end for
```

D. Row Group Size Determination

Unlike state-of-the-art file formats, FlashQueryFile 80 is configured to factor in column characteristics such as sort order, cardinality, etc., to make a more informed row group size determination for yielding better performance. For example, as per disclosed experiments, if a column has a high cardinality and is not sorted, having a larger row group size makes the selection algorithm 104 (scan algorithm) faster in embodiments. Accordingly, the FlashQueryFile 80 configures the FlashQueryFile file 304 to have a large row group size for such as case.

On the other hand, if the column is sorted and has high cardinality, small row group size works much better as small row group size results in a lot of row group skips. Accordingly, the FlashQueryFile 80 configures the FlashQueryFile file 304 to have a small row group size in such as case. For example, a large row group size may contain millions of rows (e.g., 10 million) and a small row group size may contain only thousands of rows (e.g., 50,000).

E. High Performance Coding

Java, which is currently the language of choice for Big Data ecosystems such as Hadoop, is inherently not optimized for high performance computing. The experimenter had to make multiple changes and carefully select APIs that do not have significant inherent overhead to exploit maximum performance from flash. A majority of the APIs, especially the file system APIs are designed around hard disks. For example, Buffered Input Stream is not the best choice to read a small 4 bytes or even 4 KB (kilobytes) data as it will unnecessarily read in (buffer) more data in the java buffer than needed. Using a file system API which performs a lot of lock checking and is designed for thread-safeness is also not needed if IO is happening in random to different blocks. Using a simple file channel with offset specified in the call, worked the best. APIs that allow direct IO work better than indirect IO. Java serialization and deserialization of classes is very time consuming and consumes lot more space on the storage than the actual class size. The experimenter coded fast and space-efficient representation of the necessary data structures such as dictionary, lookup, row position blobs, etc. and read and write mechanisms for the data structures to the underlying storage. Languages such as C support efficient representation of data structures and serialization/deserialization is not expensive. Hence, data structures can be represented as structs in C version of the code.

F. Hybrid and Tiered Layout

Flash is more expensive than hard disk drive and has limited capacity that needs to be used wisely in a manner that yields best performance/$ value for the solution. While flash yields 40-1000× higher random TOP (TO processor) performance than disks, the sequential bandwidth is only 2-7× higher than disks. A naive way to use flash would be to place all the popular columns in flash. However, not all popular columns have characteristics that are suitable for flash. For example, consider a case where a column has a very low cardinality such as that of a column which keeps track of gender (i.e., male or female, and thus case a cardinality of 2 (male and female)). Since the data of interest for such a column is huge (i.e., high popularity), it is much better to simply sequentially scan the data with one call instead of sending out multiple calls to read the data randomly. Thus, such a column, in spite of its popularity, would not yield the best performance/$ value for flash as factored into and determined by FlashQueryFile 80. On the other hand, a column with high cardinality is a better fit for the flash as relatively less data needs to be read per value. FlashQueryFile 80 is very selective about the data that is to be placed in the flash and uses an optimization algorithm based on column characteristics (which is beyond the scope of this disclosure) to decide the right tier (i.e., either flash memory 75 or hard disk drive 28) for a particular database column. In a tiered setting, the dictionary containing unique values of the selection column is placed in the flash, and the rest of the layout is placed on hard disk drive. In case of projection columns, the lookup structure is placed in the flash as well.

As executed by FlashQueryFile 80, FIG. 5 illustrate the layout of FlashQueryFile file block, and illustrates the split of columns across file system blocks on the same (a single) data node/cluster 10. FIG. 5 is a table 502 illustrating the original relationship of rows and columns, such that the rows and columns are grouped into row groups (such as row group ($RG_1$) through row group ($RG_N$), which will be ingested by the FlashQueryFile 80 for storage on the flash memory 75 and/or hard disk drive memory 34 as determined according to an embodiment. The row groups are utilized as discussed herein.

IV. Evaluation

The experimenters generated 40 GB of TPCH dataset by opting for a scale factor of 40. The line item table had 240+ million rows and 16 columns of varying lengths and characteristics. The experimenters compared the performance of FlashQueryFile 80 serde with the ORCFile serde. The data was placed on flash in both scenarios to highlight the effectiveness of the new flash optimized file format, data layout, selection algorithm, and projection algorithm of FlashQueryFile 80, compared to laying out HDD optimized ORCFile format on flash and accessing HDD optimized ORCFile format using HDD-optimized ORCFile selection and projection operators. This scenario is very typical for cases where data is deemed as popular and is moved from slower HDD tier to faster storage tier without notifying the application performing the querying into the storage. As a result, the application, being oblivious to the new location of the data, still accesses the data using HDD-optimized code. The evaluation was performed on a server that had six quad-core Intel Xeon CPU E5645 @ 2.40 GHz, and 96 GB RAM. The results shown (shown in FIG. 7) are with TPCH query 1 and multiple predicate values were used to allow a range of query selectivity.

A. Performance and Data Analysis

Figure 6:
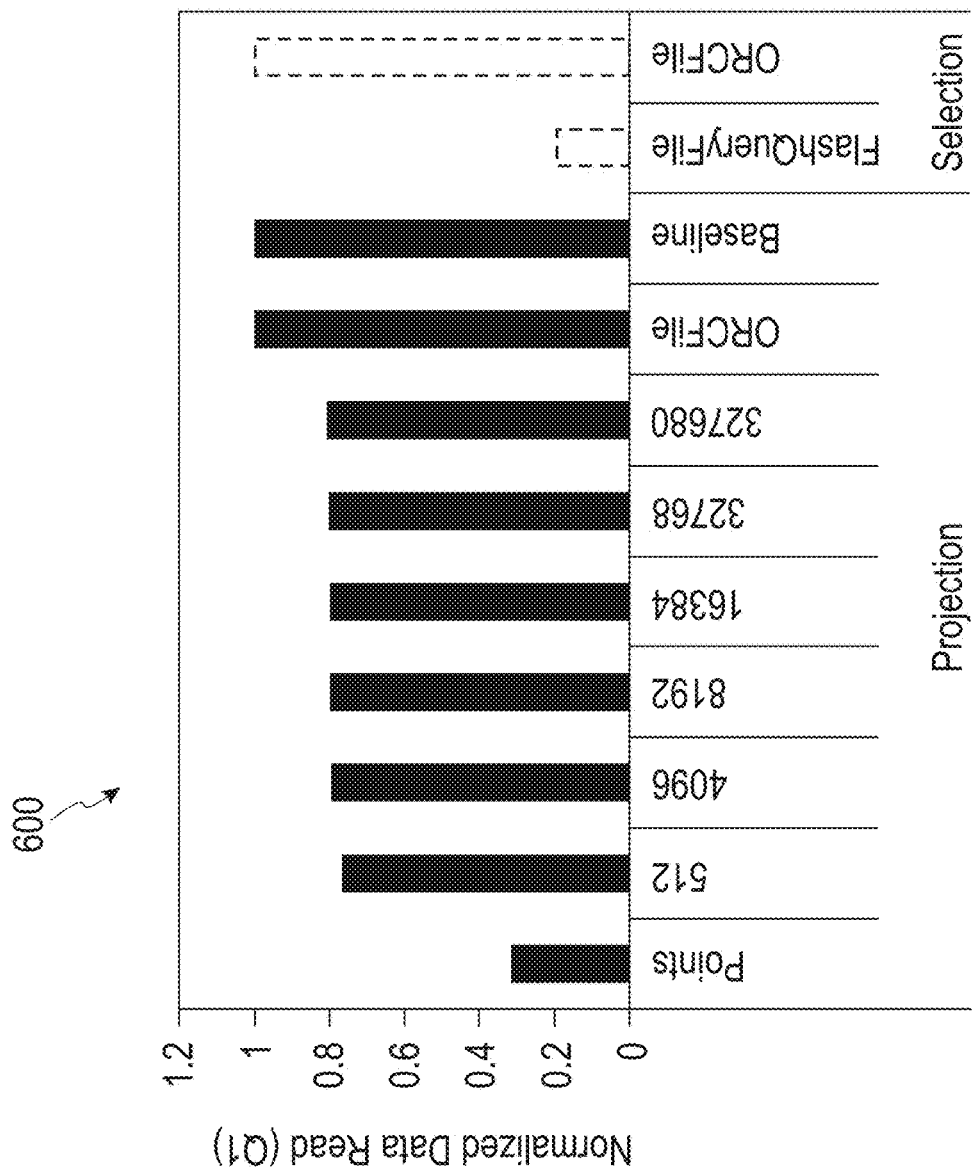
FIG. 6 illustrates a comparison of normalized data reads according to an embodiment.

FIG. 6 illustrates a graph 600 that show the normalized data read for FlashQueryFile 80 compared to other algorithms.

Figure 7:
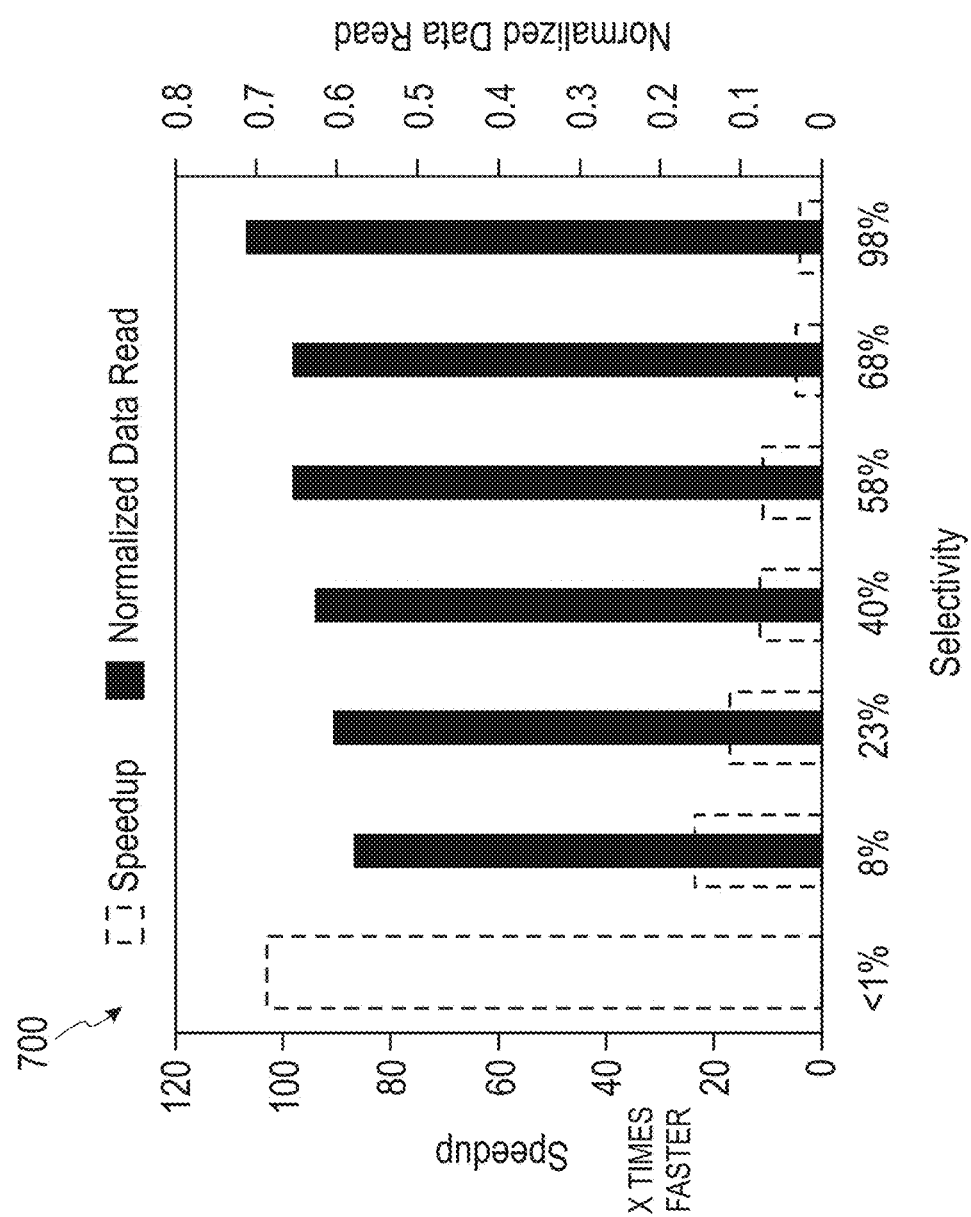
FIG. 7 illustrates the speedup of an example query according to embodiment.

In graph 700, FIG. 7 shows one example of the speedup of query 1 with FlashQueryFile 80 according to embodiments. FIG. 7 shows the speedup of TPCH Query 1 with FlashQueryFile 80 vs. ORCFile. FIG. 7 shows the speedup of query 1 with FlashQueryFile 80. The query has one selection column 1 shipdate and six projection columns. To showcase the sensitivity of the results, the selectivity of query 1 was varied from <1% to 98% by changing the predicate value for the selection column 1 shipdate. FlashQueryFile 80 processes queries much faster than ORCFile, because the FlashQueryFIle 80 reads much less data courtesy of its io-efficient algorithms and layouts, and takes advantage of high internal io parallelism and fast random accesses of flash.

Figure 8:
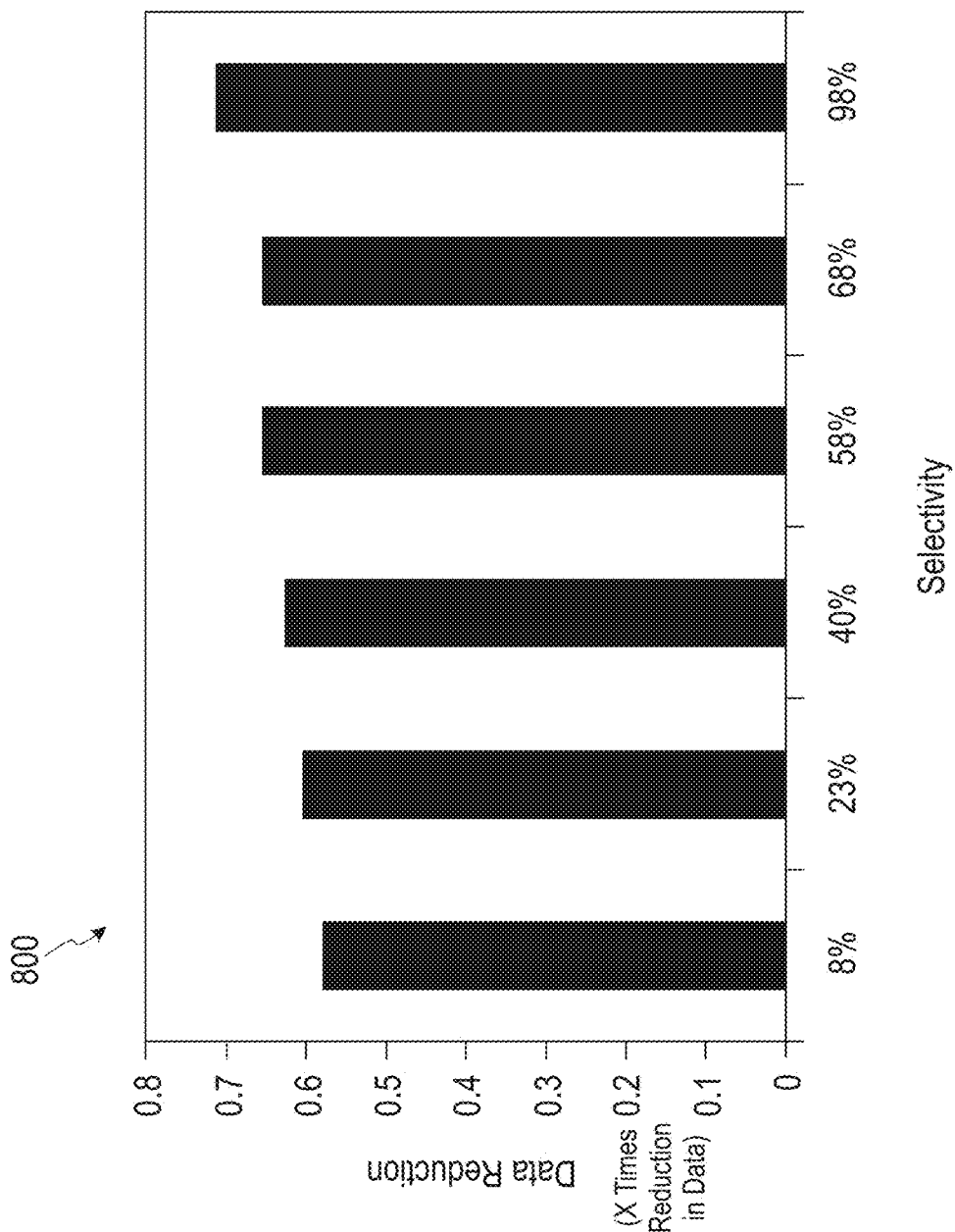
FIG. 8 is a graph illustrating the reduction in data read while processing according to an embodiment.

FIG. 8 illustrates data reduction in the selection and projection phase of TPCH query 1 with FlashQueryFile 80. ORCFile only has a coarse-grained mechanism in place for filtering out row groups based on min and max summary information. The FlashQueryFile is able to achieve up to 23× (times) speedup even in the scenario where ORCFile is also placed on flash memory as FlashQueryFile's format and access methods are optimized for flash while ORCFile is designed for HDD. The x-axis shows the selectivity and the y-axis shows the speedup in magnitude in times faster for the FlashQueryFile 80 than ORCFile. Speedup is calculated by dividing the query processing time of ORCFile by query processing time of FlashQueryFile The flash-optimized file format (disclosed herein) of the FlashQueryFile 80 is important to derive the true performance/$ value from flash (e.g., flash 75). The high speedup is made possible because of reduction in the amount of the data read courtesy of the new format and algorithms, and exploitation of flash's high performance random accesses and higher level of 10 parallelism in case of FlashQueryFile vs. RCFile. A serde such as ORCFile that is optimized for HDD yields much less performance gain when simply placed on faster, randomly accessible mediums such as flash or RAM.

Further regarding FIG. 8, FlashQueryFile 80 is able to achieve significant reduction in data courtesy of its fine-grained data skipping. ORCFile ends up reading the entire data in the selection column for query 1. The cardinality of the selection column 1 shipdate is low and in scenarios when the selectivity is low, a large number of row position data can be skipped and thus not get read. The projection algorithm results in further reduction of data read during the projection phase. Furthermore, the selection optimized dictionary based layout results in a more space-efficient data encoding and is the reason behind data reduction even in the scenario where selectivity is as high as 98%.

The ORCFile only has a coarse-grained mechanism in place for filtering out row groups based on min and max summary information. The mechanism of the ORCFile fails to find any row group to skip and ends up reading the entire data in the selection column for query 1. On the other hand, FlashQueryFile 80 performs intra-row-group data skipping and is able to skip 81% of data in the selection column l_shipdate. Cardinality of l_shipdate is low. The dictionary size is small and each row position blob is large. The row position blobs that do not match the predicate get skipped by the FlashQueryFile 80, resulting in a data read of only 19% of the data. Furthermore, dictionary based layout results in a more space-efficient data encoding and is the reason behind data reduction even in the scenario where selectivity is as high as 98% as shown in FIG. 7. Data reduction happens during the projection phase as well as FlashQueryFile reads data only from the final set of row positions that match all the predicates. The data reduction depends on the projection buffer size, where lower the size, the higher the data reduction. However, performance suffers at very small projection buffer sizes until unless the selectivity is <1%. The projection algorithm's data reduction increases as the projectivity (i.e., number of columns projected) increases.

Figure 9:
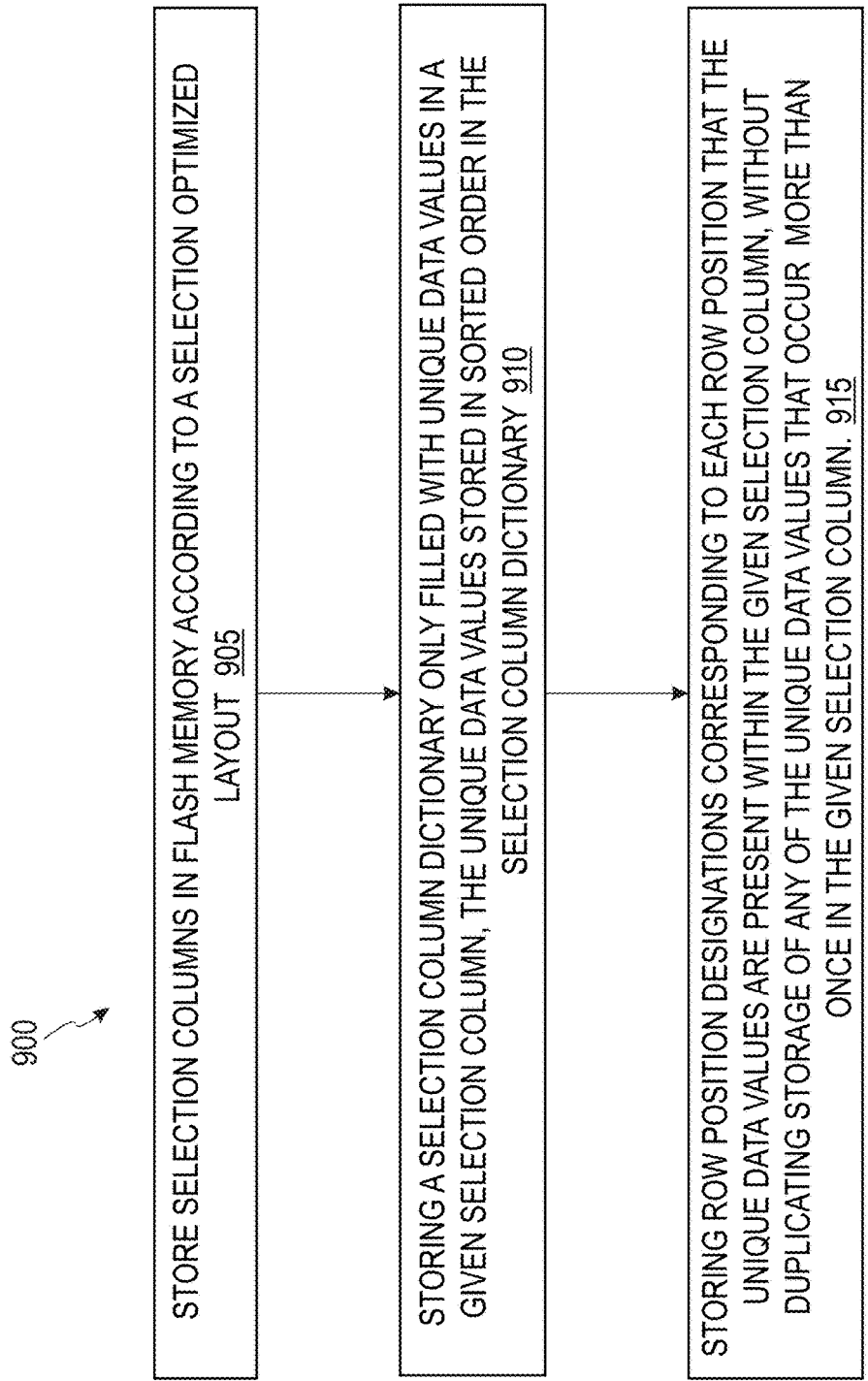
FIG. 9 is a flow chart illustrating a method for flash-optimized data layout of a dataset queries according to an embodiment.

FIG. 9 is a flow chart 900 illustrating a method (executed by the FlashQueryFile 80 which includes its sub-components) for flash-optimized data layout of a dataset queries according to an embodiment. Reference can be made to FIGS. 1-8. Note that the various algorithms and selection and projection layouts can be used for both flash memory and HDD memory, although the greatest improvement in speed may be in the flash memory.

At block 905, the FlashQueryFile 80 is configured to store (via one or more processors 16) selection columns in flash memory 75 according to a selection optimized layout 402), in which the selection optimized layout 402 is configured to optimize random accesses to the selection columns (and/or predicate matching and data skipping).

At block 910, the selection optimized layout 402, for each selection column, is formed by storing a selection column dictionary 403 only filled with unique data values in a given selection column (e.g., column C1 only stores unique data values 121, 130, 140, 150 in the selection column dictionary 403 although some of the data values may have been repeated in the original relationship 401), in which the unique data values are stored in sorted order in the selection column dictionary 403.

At 915, the selection optimized layout 402, for each selection column, is formed by storing row position designations 405 corresponding to each row position that the unique data values are present within the given selection column, without duplicating storage of any of the unique data values that occur more than once in the given selection column. For example, the data value 121 occurs 3 times (in the original relationship 401) in row positions r2, r3, r6, but the data value 121 is uniquely stored only once in the dictionary 403 in FIG. 4B.

The selection optimized layout, for the given selection column, is formed by storing a single offset to individual row positions having a same unique data value in the row positions designations. For example, FIG. 4D has offset structure 450 (e.g., a storage location in flash memory 75), and the offset structure 450 stores offset $O_1$ corresponding to the individual row positions r2, r3, r6, r9, r10, r11, r13 (the row position designations/list 405) all having the same unique data value 121. For column C1 in FIG. 4D, the unique data value 121 is only stored once in the dictionary 403.

The individual row positions having the same unique data value are stored in a same memory location within the row positions designations 405. For example, the individual row positions r2, r3, r6, r9, r10, r11, r13 are stored in a single/same memory location in the row position designations/list 405 in FIG. 4D.

The individual row positions each correspond to the same unique data value in the given selection column such that a match to the same unique data value causes each of the individual row positions to be read from the same memory location without having to read other individual row positions not having the same unique data value. In FIG. 4D, operation 2 matches unique data value 130 and 150 respectively to the predicate c1=130 and c1=150. Operation 3 reads out the corresponding row position blobs, which are the memory location containing the individual row positions r1, r4 for matching unique data value 130 and the individual row positions r5, r12, r14 for matching unique data value 150.

The FlashQueryFile 80 is configured to store projection columns in the flash memory 75 according to a projection optimized layout 404, in which the projection optimized layout 404 is configured to optimize random accesses to the projection columns. The projection optimized layout 404, for each projection column, is formed by storing a projection column dictionary 408 only filled with unique data values in a given projection column, in which the unique data values are stored in sorted order in the projection column dictionary 408. For example, the projection column dictionary 408 only stores the unique data values 600, 602, 603, 670, 680 once in FIG. 4C although the original relationship 401 in FIG. 4A repeats some of these data values. The projection optimized layout 404, for each projection column, comprises storing a lookup structure 406 comprising an index per row position (in another case an offset per row position) to each of the unique data values in the given projection column (along with a size per row position for each of the unique data values), without duplicating storage of any of the unique data values that occur more than once in the given projection column.

The projection optimized layout, for the given projection column, is formed by storing in the lookup structure indexes (in another case a same size and a same offset) for individual row positions having a same unique data value in the given projection column, such that the individual row positions are read without having to read all row positions in the given projection column. In the lookup structure 406 for row positions r4 and r6 in FIG. 4C, the offsets off$_{r4}$ and off$_{r6}$ are the same for their corresponding unique data value 670. Likewise, (in the lookup structure 406 for row positions r4 and r6 in FIG. 4C) the data sizes (kilobytes) size$_{r4}$ and size$_{r6}$ are the same for their same corresponding unique data value 670.

The projection optimized layout, for the given projection column, is formed by storing in the lookup structure another same size and another same offset for other individual row positions having another same unique data value in the given projection. For example, in the lookup structure 406 for row positions r5 and r7 in FIG. 4C, these row positions have the same offsets (value) off$_{r5}$ and off$_{r7}$ same sizes size$_{r5}$ and size$_{r7}$ for their same corresponding unique data value 680 in column c3.

The FlashQueryFile 80 is configured to receive a query to be run against the dataset, in which the query comprises a projection part and a selection part. FlashQueryFile 80 is configured to execute the selection part before executing the projection part of the query (also referred to as late materialization herein). The selection part comprises a predicate to be matched according to rules in the selection part. The projection part comprises a requirement to retrieve the unique data values from the dataset.

Executing the selection part (by the FlashQueryFile 80) comprises reading statistics of row groups (i.e., metadata headers in FIG. 3) for the given selection column in order to skip row groups having statistics falling outside of a range for the predicate, in which reading the statistics for the row groups of the given selection column is performed without needing to read the actual unique data values in the row groups themselves at the time of the reading. The row groups are rows in the given selection column that have been grouped together (as shown in FIG. 5). For remaining row groups of the given selection column that have not been skipped, FlashQueryFile 80 is configured to retrieve the unique data values in the selection column dictionary 403 for the remaining row groups (un-skipped row groups) of the given selection column in a multi-threaded fashion with each thread processing an individual row group. A thread is a sequence of program instructions executed by a processor. The FlashQueryFile 80 is configured to execute predicate matching of the predicate against the unique data values in the selection column dictionary 403 for the remaining row groups in order to find matching unique values. FlashQueryFile 80 retrieves only the row positions for the matching unique values in the given selection column without retrieving (or reading) the skipped row group positions.

Executing the projection part of the query comprises retrieving offsets (e.g., in the lookup structure 406) relative to each of the row positions for the matching unique values in order to retrieve the matching unique values. Executing the requirement (which may simply be retrieve the row positions of the matching unique values) in the projection part of the query on the matching unique values of the row positions in order to return the answer to the query. The projection part may comprise a requirement to retrieve data values from the dataset. The projection part/phase of the query tells the FlashQueryFile 80 what is to be done with the matching unique values.

Further regarding flash memory, flash memory is an electronic non-volatile computer storage medium that can be electrically erased and reprogrammed as understood by one skilled in the art. There are two main types of flash memory, which are named after the NAND and NOR logic gates. The internal characteristics of the individual flash memory cells exhibit characteristics similar to those of the corresponding gates. NAND type flash memory may be written and read in blocks (or pages) which are generally much smaller than the entire device. NOR type flash allows a single machine word (byte) to be written (to an erased location) or read independently. Flash memory stores information in an array of memory cells made from floating-gate transistors. In traditional single-level cell (SLC) devices, each cell stores only one bit of information. Some newer flash memory, known as multi-level cell (MLC) devices, including triple-level cell (TLC) devices, can store more than one bit per cell by choosing between multiple levels of electrical charge to apply to the floating gates of its cells.

Further regarding hard disk drives, a hard disk drive (HDD) is a data storage device used for storing and retrieving digital information using rapidly rotating disks (platters) coated with magnetic material. An HDD retains its data even when powered off. An HDD consists of one or more rigid ("hard") rapidly rotating disks (platters) with magnetic heads arranged on a moving actuator arm to read and write data to the surfaces.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for flash-optimized data layout of a dataset for queries, the method comprising:
   storing, by a processor, selection columns in flash memory according to a selection optimized layout, the selection optimized layout being configured to optimize predicate matching and data skipping;
   wherein the selection optimized layout, for each selection column, is formed by:
      storing a selection column dictionary filled with unique data values in a given selection column, the unique data values stored in sorted order in the selection column dictionary; and
      storing row position designations corresponding to each row position that the unique data values are present within the given selection column, without duplicating storage of any of the unique data values that occur more than once in the given selection column.

2. The method of claim 1, wherein the flash memory comprises a multi-level cell device such that more than one bit is storable within each cell, wherein the flash memory is incorporated in a cloud computing environment, and wherein the dataset comprises a table having a plurality of columns, the method further comprising:
   storing projection columns in the flash memory according to a projection optimized layout, the projection optimized layout being configured to optimize random accesses to the projection columns;
   wherein the projection optimized layout, for each projection column, is formed by:
      storing a projection column dictionary filled with unique data values in a given projection column, the unique data values in the given projection column stored in sorted order in the projection column dictionary; and
      storing a lookup structure comprising an index per row position to each of the unique data values in the given projection column, without duplicating storage of any of the unique data values that occur more than once in the given projection column;
   storing hybrid projection and selection columns in the flash memory according to a hybrid projection and selection optimized layout, wherein each hybrid projection and selection column has a sorted order such that duplicative data values in a given hybrid projection and selection column are arranged in consecutive rows within that hybrid projection and selection column;
   wherein the hybrid projection and selection optimized layout, for each hybrid projection and selection column and without duplicating storage of any of the duplicative data values in the given hybrid projection and selection column, is formed by:
      storing a hybrid projection and selection column dictionary filled with one of each duplicative data value in the given hybrid projection and selection column, the ones of each duplicative data values stored in sorted order in the hybrid projection and selection column dictionary;

storing a combined lookup and row position designation structure, the combined lookup and row position designation structure comprising, for each data value stored in the hybrid projection and selection column dictionary, a pair of row position designations corresponding to a first row position and a last row position that the given data value is present within the given hybrid projection and selection column, the combined lookup and row position designation structure further comprising, for each pair of row position designations, a pointer to a corresponding data value in the hybrid projection and selection column dictionary; and storing a plurality of offsets, each offset corresponding to a data value in the hybrid projection and selection column dictionary and serving to indicate a location of a first row position of a given pair of row position designations corresponding to that data value;

determining, for each column of the plurality of columns and based on selection part versus projection part query usage statistics for that column, whether to classify that column for storage in the flash memory as one of the selection columns, one of the projection columns, or one of the hybrid projection and selection columns;

receiving a query to be run against the dataset, the query comprising a projection part and a selection part, the selection part including a predicate to be matched to data values in a first hybrid projection and selection column according to rules in the selection part and the projection part including a requirement to retrieve particular data from a second hybrid projection and selection column to use in answering the query;

executing the selection part by:
   matching the predicate to a first data value in a first hybrid projection and selection column dictionary for the first hybrid projection and selection column;
   identifying among a first plurality of offsets for data values in the first hybrid projection and selection column dictionary a first offset that corresponds to the first data value; and
   locating, using the first offset and within a first combined lookup and row position designation structure for the first hybrid projection and selection column, a first pair of row position designations corresponding to a first row position and a last row position that the first data value is present within the first hybrid projection and selection column; and executing the projection part by:
   identifying, using the first pair of row position designations, a second pair of row position designations in a second combined lookup and row position designation structure for the second hybrid projection and selection column, wherein the second pair row position designations overlaps the first pair of row position designations;
   locating, using a second pointer in the second combined lookup and row position designation structure corresponding with the second pair row position designations, a second data value in a second projection and selection column dictionary that is present within the second pair of row positions in the second hybrid projection and selection column; and
   using the second data value to answer to the query.

\* \* \* \* \*